US012565552B2

(12) United States Patent
Esseghir et al.

(10) Patent No.: US 12,565,552 B2
(45) **Date of Patent: *Mar. 3, 2026**

(54) THERMOPLASTIC COMPOSITIONS COMPRISING BIMODAL POLYETHYLENE AND ARTICLES MANUFACTURED THEREFROM

(71) Applicant: Dow Global Technologies LLC, Midland, MI (US)

(72) Inventors: Mohamed Esseghir, Collegeville, PA (US); Chuan C. He, South Charleston, WV (US); Mridula Kapur, Lake Jackson, TX (US); Andrew T. Heitsch, Lake Jackson, TX (US); Theo Geussens, Horgen (CH); John F. Szul, South Charleston, WV (US)

(73) Assignee: Dow Global Technologies LLC, Midland, MI (US)

( * ) Notice: Subject to any disclaimer, the term of this patent is extended or adjusted under 35 U.S.C. 154(b) by 471 days.

This patent is subject to a terminal disclaimer.

(21) Appl. No.: 18/040,546

(22) PCT Filed: Jul. 7, 2021

(86) PCT No.: PCT/US2021/040644

§ 371 (c)(1),
(2) Date: Feb. 3, 2023

(87) PCT Pub. No.: WO2022/031397

PCT Pub. Date: Feb. 10, 2022

(65) Prior Publication Data

US 2023/0303737 A1 Sep. 28, 2023

Related U.S. Application Data

(60) Provisional application No. 63/061,369, filed on Aug. 5, 2020.

(51) Int. Cl.

*C08F 210/16* (2006.01)
*C08F 4/659* (2006.01)
*H01B 1/22* (2006.01)
*H01B 3/30* (2006.01)

(52) U.S. Cl.

CPC ........ *C08F 210/16* (2013.01); *C08F 4/65908* (2013.01); *H01B 1/22* (2013.01); *H01B 3/30* (2013.01)

(58) Field of Classification Search

CPC ...... C08F 210/16; C08F 2500/05; H01B 3/30; H01B 7/00; H01B 9/00

See application file for complete search history.

(56) References Cited

U.S. PATENT DOCUMENTS

| | | | |
|---|---|---|---|
| 3,709,853 | A | 1/1973 | Karapinka |
| 4,003,712 | A | 1/1977 | Miller |
| 4,011,382 | A | 3/1977 | Levine et al. |
| 4,302,566 | A | 11/1981 | Karol et al. |
| 4,543,399 | A | 9/1985 | Jenkins, III et al. |
| 4,665,208 | A | 5/1987 | Welborn, Jr. et al. |
| 4,874,734 | A | 10/1989 | Kioka et al. |
| 4,882,400 | A | 11/1989 | Dumain et al. |
| 4,908,463 | A | 3/1990 | Bottelberghe |
| 4,924,018 | A | 5/1990 | Bottelberghe |
| 4,952,540 | A | 8/1990 | Kioka et al. |
| 4,968,827 | A | 11/1990 | Davis |
| 5,041,584 | A | 8/1991 | Crapo et al. |
| 5,091,352 | A | 2/1992 | Kioka et al. |
| 5,103,031 | A | 4/1992 | Smith, Jr. |
| 5,157,137 | A | 10/1992 | Sangokoya |
| 5,204,419 | A | 4/1993 | Tsutsui et al. |
| 5,206,199 | A | 4/1993 | Kioka et al. |
| 5,235,081 | A | 8/1993 | Sangokoya |
| 5,248,801 | A | 9/1993 | Sangokoya |
| 5,329,032 | A | 7/1994 | Tran et al. |
| 5,352,749 | A | 10/1994 | DeChellis et al. |
| 5,473,202 | A | 12/1995 | Mudge et al. |
| 5,541,270 | A | 7/1996 | Chinh et al. |

(Continued)

FOREIGN PATENT DOCUMENTS

| | | | |
|---|---|---|---|
| CA | 2741603 | C | 9/2013 |
| CN | 104672593 | A | 6/2015 |

(Continued)

OTHER PUBLICATIONS

Singapore Search Report and Written Opinion dated Mar. 4, 2025, pertaining to SG Patent Application No. 11202300578Y, 9 pgs.
Singapore Search Report and Written Opinion dated Mar. 4, 2025, pertaining to SG Patent Application No. 11202300726W, 9 pgs.
International Search Report and Written Opinion dated May 11, 2021, pertaining to Int'l Patent Application No. PCT/US2021/040644, 9 pgs.
International Search Report and Written Opinion dated Nov. 5, 2021, pertaining to Int'l Patent Application No. PCT/US2021/040645, 16 pgs.
Balke et al. "A Strategy for Interpreting Multidetector Size-Exclusion Chromatography Data II, Application in Plastic Waste Recovery", Chromatography Polymers, Chapter 13, 1992, pp. 198-219.
Kratochvil "Fundamental Light-Scattering Methods", Chapter 3, 1987, pp. 113-144.

(Continued)

*Primary Examiner* — Robert C Boyle
(74) *Attorney, Agent, or Firm* — Dinsmore & Shohl LLP

(57) ABSTRACT

In various embodiments, a bimodal polyethylene may include a high molecular weight component and a low molecular weight component. The bimodal polyethylene may have a density of from 0.933 grams per centimeter ($g/cm^3$) to 0.960 $g/cm^3$, a melt index ($I_2$) of from 0.3 decigrams per minute (dg/min) to 1.2 dg/min, a melt flow ratio ($MFR_{21}$) greater than 80.0, a molecular weight distribution ($M_w/M_n$) greater than 10, a reverse comonomer distribution, and a shear thinning index of from 5.0 to 20.0. Methods for producing the bimodal polyethylene, articles manufactured from the bimodal polyethylene are also provided.

12 Claims, No Drawings

(56) References Cited

U.S. PATENT DOCUMENTS

| | | | |
|---|---|---|---|
| 5,648,310 | A | 7/1997 | Wasserman et al. |
| 5,665,818 | A | 9/1997 | Tilston et al. |
| 5,677,375 | A | 10/1997 | Rifi et al. |
| 5,688,880 | A | 11/1997 | Spencer et al. |
| 5,770,755 | A | 6/1998 | Schertl et al. |
| 5,798,427 | A | 8/1998 | Foster et al. |
| 5,889,128 | A | 3/1999 | Schrock et al. |
| 5,965,477 | A | 10/1999 | Sivaram et al. |
| 5,972,510 | A | 10/1999 | O'Hare et al. |
| 5,998,558 | A | 12/1999 | Wasserman et al. |
| 6,034,187 | A | 3/2000 | Maehama et al. |
| 6,063,871 | A | 5/2000 | Kishine et al. |
| 6,159,617 | A | 12/2000 | Foster et al. |
| 6,340,730 | B1 | 1/2002 | Murray et al. |
| 6,403,717 | B1 | 6/2002 | Adams et al. |
| 6,472,484 | B1 | 10/2002 | Abe et al. |
| 7,037,977 | B2 | 5/2006 | Miserque et al. |
| 7,230,054 | B2 | 6/2007 | Mavridis et al. |
| 7,812,094 | B2 | 10/2010 | Kvamme et al. |
| 7,943,700 | B2 | 5/2011 | Crowther et al. |
| 8,378,029 | B2 | 2/2013 | Liu et al. |
| 9,512,307 | B2 | 12/2016 | Mathur et al. |
| 10,053,563 | B2 | 8/2018 | Trolez et al. |
| 10,087,296 | B2 | 10/2018 | Ek et al. |
| 10,308,798 | B2 | 6/2019 | Ek et al. |
| 2002/0119890 | A1 | 8/2002 | Wenzel et al. |
| 2004/0062942 | A1 | 4/2004 | Lustiger et al. |
| 2004/0240809 | A1 * | 12/2004 | Tedder ............... G02B 6/44384 385/109 |
| 2005/0119413 | A1 | 6/2005 | Maziers |
| 2008/0114131 | A1 | 5/2008 | Harris et al. |
| 2015/0031540 | A1 | 1/2015 | Burton et al. |
| 2015/0357081 | A1 | 12/2015 | Mizuno et al. |
| 2016/0002450 | A1 | 1/2016 | Chiba et al. |
| 2016/0009908 | A1 | 1/2016 | Chiba et al. |
| 2020/0199270 | A1 | 6/2020 | Zhang et al. |
| 2023/0242744 | A1 | 8/2023 | Liu et al. |
| 2024/0110041 | A1 | 4/2024 | Van Mierloo et al. |

FOREIGN PATENT DOCUMENTS

| | | | | |
|---|---|---|---|---|
| CN | 104870549 | A | 8/2015 | |
| CN | 105086076 | A | 11/2015 | |
| CN | 106519391 | A | 3/2017 | |
| CN | 107304283 | A | 10/2017 | |
| CN | 108384090 | A | 8/2018 | |
| CN | 111183160 | A | 5/2020 | |
| EP | 0517868 | B1 | 12/1991 | |
| EP | 0664301 | B1 | 1/1994 | |
| EP | 0279586 | B1 | 5/1994 | |
| EP | 0802202 | B1 | 5/1994 | |
| EP | 0802203 | B1 | 4/1997 | |
| EP | 0516476 | B1 | 10/1997 | |
| EP | 0893454 | A1 | 2/1998 | |
| EP | 0511665 | B1 | 7/1998 | |
| EP | 0594218 | B1 | 3/1999 | |
| EP | 0767184 | B1 | 8/1999 | |
| EP | 0561476 | B1 | 9/1999 | |
| EP | 0794200 | B1 | 7/2000 | |
| EP | 1739103 | A1 | 1/2007 | |
| EP | 1752462 | B1 | 3/2009 | |
| EP | 2353169 | B1 | 10/2009 | |
| EP | 2907843 | B1 | 11/2017 | |
| EP | 3406666 | A1 | 11/2018 | |
| JP | 2009235367 | A | 10/2009 | |
| JP | 2011210418 | A | 10/2011 | |
| JP | 2020514430 | A | 5/2020 | |
| KR | 102019261 | B1 | 3/2019 | |
| NO | 2019070329 | A1 | 4/2019 | |
| WO | 1994010180 | A | 5/1994 | |
| WO | 1997003124 | A | 1/1997 | |
| WO | 1997028170 | A | 8/1997 | |
| WO | 1998032776 | A | 7/1998 | |
| WO | 1999040125 | A | 8/1999 | |
| WO | 1999047598 | A | 9/1999 | |
| WO | 1999048605 | A | 9/1999 | |
| WO | 1999050311 | A | 10/1999 | |
| WO | 1999060033 | A | 11/1999 | |
| WO | 1999061489 | A | 12/1999 | |
| WO | 2003010208 | A1 | 2/2003 | |
| WO | 2003033587 | A1 | 4/2003 | |
| WO | 2003051514 | A1 | 6/2003 | |
| WO | 2003051934 | A2 | 6/2003 | |
| WO | 2004085499 | A2 | 10/2004 | |
| WO | 2005002744 | A1 | 1/2005 | |
| WO | 2005092973 | A1 | 10/2005 | |
| WO | 2007130553 | A2 | 11/2007 | |
| WO | 2014099360 | A1 | 6/2014 | |
| WO | 2016005265 | A1 | 1/2016 | |
| WO | 2018019925 | A1 | 2/2018 | |
| WO | 2018064035 | A1 | 4/2018 | |
| WO | WO-2019051006 | A1 * | 3/2019 | .......... C08L 23/0815 |
| WO | 2019190898 | A1 | 10/2019 | |

OTHER PUBLICATIONS

Zimm "Apparatus and Methods for Measurement and Interpretation of the Angular Variation of Light Scattering; Preliminary Results on Polystyrene Solutions", Light Scattering in Polystyrene, 1948, pp. 1099-1116.

Communication pursuant to Article 94(3) EPC dated Oct. 18, 2024, pertaining to EP Patent Application No. 21756092.9, 6 pgs.

Chinese Office Action dated Mar. 18, 2025, pertaining to CN Patent Application No. 202180058844X, 19 pgs.

Japanese Office Action dated May 13, 2025, pertaining to JP Patent Application No. JP 2023-506282, 11 pgs.

Brazilian Technical Report dated Apr. 14, 2025, pertaining to BR Patent Application No. BR112023002145.6, 7 pgs.

US Restriction Requirement dated May 23, 2025, pertaining to U.S. Appl. No. 18/019,702, 8 pgs.

Japanese Office Action dated Jun. 3, 2025, pertaining to JP Patent Application No. JP 2023-506167, 8 pgs.

US Non-Final Office Action dated Aug. 11, 2025, pertaining to U.S. Appl. No. 18/019,702, 14 pgs.

Japanese Notice of Reasons for Refusal dated Nov. 18, 2025, pertaining to JP Patent Application No. 2023-506282, 4 pgs.

Korean Office Action dated Dec. 15, 2025, pertaining to KR Patent Application No. 10-2023-7007147, 18 pgs.

Chinese Office Action dated Jan. 10, 2026, pertaining to CN Patent Application No. 202180054834.9, 7 pgs.

Chinese Office Action dated Jan. 9, 2026, pertaining to CN Patent Application No. 202180058844.X, 19 pgs.

* cited by examiner

THERMOPLASTIC COMPOSITIONS COMPRISING BIMODAL POLYETHYLENE AND ARTICLES MANUFACTURED THEREFROM

CROSS REFERENCE TO RELATED APPLICATION

This application is a national stage entry of PCT/US2021/040644 filed on Jul. 7, 2021, which claims priority to U.S. Provisional Patent Application No. 63/061,369 filed on Aug. 5, 2020, the entire disclosures of which are hereby incorporated by reference.

TECHNICAL FIELD

Embodiments of the present disclosure are generally directed to thermoplastic compositions and, in particular, thermoplastic compositions comprising bimodal polyethylene and articles manufactured therefrom.

BACKGROUND

When manufacturing insulation and jacket layers for wires and cables, both the performance (e.g., mechanical properties, environmental stress-cracking resistance, etc.) and the processability of the thermoplastic compositions used for the manufacture of the insulation and jacket layers are critical in order to ensure both success in fabrication and long-term durability during service. While some thermoplastic compositions may have superior mechanical properties, such as elongation at break, these superior mechanical properties are typically achieved by sacrificing processability, environmental stress-cracking resistance, or combinations thereof. In contrast, other thermoplastic compositions may achieve superior processability by sacrificing mechanical properties, environmental stress-cracking resistance, or combinations thereof. Accordingly, there is an ongoing need for thermoplastic compositions that balance mechanical properties and processability while also maintaining environmental stress-cracking resistance.

SUMMARY

Embodiments of the present disclosure address these needs by providing a bimodal polyethylene comprising a high molecular weight component and a low molecular weight component. The bimodal polyethylene may have a density of from 0.933 grams per centimeter ($g/cm^3$) to 0.960 $g/cm^3$, a melt index ($I_2$) of from 0.3 decigrams per minute (dg/min) to 1.2 dg/min, a melt flow ratio ($MFR_{21}$) greater than or equal to 80.0, a molecular weight distribution ($M_w/M_n$) greater than or equal to 10, a reverse comonomer distribution, and a shear thinning index of from 5.0 to 20.0.

These and additional features provided by the embodiments of the present disclosure will be more fully understood in view of the following detailed description.

DETAILED DESCRIPTION

As noted hereinabove, when manufacturing insulation and jacket layers for wires and cables, both the performance (e.g., mechanical properties, environmental stress-cracking resistance, etc.) and the processability of the thermoplastic compositions used for the manufacture of the insulation and jacket layers are critical in order to ensure both success in fabrication and long-term durability during service. Typically, high density polyethylene is used to produce thermoplastic compositions in order to achieve insulation and jacket layers with improved mechanical properties and, as a result, improved abrasion resistance for durability and a reduced coefficient of friction for ease of installation. However, polyethylene with high density generally results in insulation and jacket layers with poor environmental stress-cracking resistance, which leads to brittle failure of the insulation and jacket layers. While reducing the density, melt index, and high load melt index of the polyethylene may improve the environmental stress-cracking resistance of the insulation and jacket layers, this may also reduce the mechanical properties of the insulation and jacket layers and processability of the polyethylene.

Embodiments of the present disclosure are directed to bimodal polyethylene with a high shear thinning index, which indicates a superior processability, while also achieving significant mechanical properties and environmental stress-cracking resistance. In particular, embodiments of the present disclosure are directed to bimodal polyethylene comprising a high molecular weight component and a low molecular weight component. The bimodal polyethylene may have a density of from 0.933 $g/cm^3$ to 0.960 $g/cm^3$, a melt index ($I_2$) of from 0.3 dg/min to 1.2 dg/min, a melt flow ratio ($MFR_{21}$) greater than or equal to 80.0, a molecular weight distribution ($M_w/M_n$) greater than or equal to 10., a reverse comonomer distribution, and a shear thinning index of from 5.0 to 20.0.

The term "polymer" refers to polymeric compounds prepared by polymerizing monomers, whether of the same or a different type. The generic term polymer thus includes homopolymers, which are polymers prepared by polymerizing only one monomer, and copolymers, which are polymers prepared by polymerizing two or more different monomers.

The term "interpolymer" refers to polymers prepared by polymerizing at least two different types of monomers. The generic term interpolymer thus includes copolymers and other polymers prepared by polymerizing more than two different monomers, such as terpolymers.

The term "unimodal polymer" refers to polymers that can be characterized by having only one fraction with a common density, weight average molecular weight, and, optionally, melt index value. Unimodal polymers can also be characterized by having only one distinct peak in a gel permeation chromatography (GPC) chromatogram depicting the molecular weight distribution of the composition.

The term "multimodal polymer" refers to polymers that can be characterized by having at least two fractions with varying densities, weight averaged molecular weights, and, optionally, melt index values. Multimodal polymers can also be characterized by having at least two distinct peaks in a gel permeation chromatography (GPC) chromatogram depicting the molecular weight distribution of the composition. The generic term multimodal polymer thus includes bimodal polymers, which have two primary fractions: a first fraction, which may be a low molecular weight fraction and/or component, and a second fraction, which may be a high molecular weight fraction and/or component.

The terms "polyolefin," "polyolefin polymer," and "polyolefin resin" refer to polymers prepared by polymerizing a simple olefin (also referred to as an alkene, which has the general formula $C_nH_{2n}$) monomer. The generic term polyolefin thus includes polymers prepared by polymerizing ethylene monomer with or without one or more comonomers, such as polyethylene, and polymers prepared by polymerizing propylene monomer with or without one or more comonomers, such as polypropylene.

The terms "polyethylene" and "ethylene-based polymer" refer to polyolefins comprising greater than 50 percent (%) by mole of units that have been derived from ethylene monomer, which includes polyethylene homopolymers and copolymers. Common forms of polyethylene known in the art include Low Density Polyethylene (LDPE), Linear Low Density Polyethylene (LLDPE), Ultra Low Density Polyethylene (ULDPE), Very Low Density Polyethylene (VLDPE), Medium Density Polyethylene (MDPE), and High Density Polyethylene (HDPE).

The term "melt flow ratio" refers to a ratio of melt indices of a polymer. The generic term melt flow ratio thus includes a ratio of a high load metal index ($I_{21}$) of a polymer to a melt index ($I_2$) of the polymer, which may also be referred to as an "$MFR_{21}$."

The term "molecular weight distribution" refers to a ratio of molecular weights of a polymer. The generic term molecular weight distribution thus includes a ratio of a weight average molecular weight ($M_w$) of a polymer to a number average molecular weight ($M_n$) of the polymer, which may also be referred to as an "molecular weight distribution ($M_w/M_n$)," and a ratio of a z-average molecular weight ($M_z$) of a polymer to a weight average molecular weight ($M_w$) of the polymer, which may also be referred to as an "molecular weight distribution ($M_z/M_w$)."

The term "shear thinning index" refers to a ratio of complex viscosities of a polymer. The generic term shear thinning index thus includes a ratio of a complex viscosity of a polymer at a frequency of 0.1 radians per second (rad/s) to a ratio of a complex viscosity of the polymer at a frequency of 100 rad/s.

The term "composition" refers to a mixture of materials that comprises the composition, as well as reaction products and decomposition products formed from the materials of the composition.

The terms "comprising," "including," "having," and their derivatives, are not intended to exclude the presence of any additional component, step, or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step, or procedure, excepting those that are not essential to operability. The term "consisting of" excludes any component, step, or procedure not specifically delineated or listed.

In embodiments, the bimodal polyethylene may have a density greater than or equal to 0.933 g/cm$^3$, such as greater than or equal to 0.936 g/cm$^3$, greater than or equal to 0.939 g/cm$^3$, greater than or equal to 0.942 g/cm$^3$, greater than or equal to 0.945 g/cm$^3$, greater than or equal to 0.948 g/cm$^3$, greater than or equal to 0.951 g/cm$^3$, greater than or equal to 0.954 g/cm$^3$, or greater than or equal to 0.957 g/cm$^3$. The bimodal polyethylene may also have a density less than or equal to 0.960 g/cm$^3$, such as less than or equal to 0.957 g/m$^3$, less than or equal to 0.954 g/m$^3$, less than or equal to 0.951 g/cm$^3$, less than or equal to 0.948 g/m$^3$, less than or equal to 0.945 g/m$^3$, less than or equal to 0.942 g/cm$^3$, less than or equal to 0.939 g/m$^3$, or less than or equal to 0.936 g/cm$^3$. For example, the bimodal polyethylene may have a density of from 0.933 g/cm$^3$ to 0.960 g/cm$^3$, from 0.933 g/cm$^3$ to 0.957 g/cm$^3$, from 0.933 g/cm$^3$ to 0.954 g/m$^3$, from 0.933 g/cm$^3$ to 0.951 g/cm$^3$, from 0.933 g/cm$^3$ to 0.948 g/cm$^3$, from 0.933 g/cm$^3$ to 0.945 g/m$^3$, from 0.933 g/cm$^3$ to 0.942 g/cm$^3$, from 0.933 g/cm$^3$ to 0.9390 g/cm$^3$, from 0.933 g/cm$^3$ to 0.936 g/m$^3$, from 0.936 g/cm$^3$ to 0.960 g/cm$^3$, from 0.936 g/cm$^3$ to 0.957 g/cm$^3$, from 0.936 g/cm$^3$ to 0.954 g/cm$^3$, from 0.936 g/cm$^3$ to 0.951 g/cm$^3$, from 0.936 g/cm$^3$ to 0.948 g/cm$^3$, from 0.936 g/cm$^3$ to 0.945 g/cm$^3$, from 0.936 g/cm$^3$ to 0.942 g/cm$^3$, from 0.936 g/cm$^3$ to 0.939 g/cm$^3$, from 0.939 g/cm$^3$ to 0.960 g/cm$^3$, from 0.939 g/cm$^3$ to 0.957 g/cm$^3$, from 0.939 g/cm$^3$ to 0.954 g/cm$^3$, from 0.939 g/cm$^3$ to 0.951 g/cm$^3$, from 0.939 g/cm$^3$ to 0.948 g/cm$^3$, from 0.939 g/cm$^3$ to 0.945 g/cm$^3$, from 0.939 g/cm$^3$ to 0.942 g/cm$^3$, from 0.942 g/cm$^3$ to 0.960 g/cm$^3$, from 0.942 g/cm$^3$ to 0.957 g/cm$^3$, from 0.942 g/cm$^3$ to 0.954 g/cm$^3$, from 0.942 g/cm$^3$ to 0.951 g/cm$^3$, from 0.942 g/cm$^3$ to 0.948 g/cm$^3$, from 0.942 g/cm$^3$ to 0.945 g/cm$^3$, from 0.945 g/cm$^3$ to 0.960 g/cm$^3$, from 0.945 g/cm$^3$ to 0.957 g/cm$^3$, from 0.945 g/cm$^3$ to 0.954 g/cm$^3$, from 0.945 g/cm$^3$ to 0.951 g/cm$^3$, from 0.945 g/cm$^3$ to 0.948 g/cm$^3$, from 0.948 g/cm$^3$ to 0.960 g/cm$^3$, from 0.948 g/cm$^3$ to 0.957 g/cm$^3$, from 0.948 g/cm$^3$ to 0.954 g/cm$^3$, from 0.948 g/cm$^3$ to 0.951 g/cm$^3$, from 0.951 g/cm$^3$ to 0.960 g/cm$^3$, from 0.951 g/cm$^3$ to 0.957 g/cm$^3$, from 0.951 g/cm$^3$ to 0.954 g/cm$^3$, from 0.954 g/cm$^3$ to 0.960 g/cm$^3$, from 0.954 g/cm$^3$ to 0.957 g/cm$^3$, or from 0.957 g/cm$^3$ to 0.960 g/cm$^3$. As noted hereinabove, when the density of the bimodal polyethylene is greater than, for example, 0.960 g/cm$^3$, articles manufactured from the bimodal polyethylene may have poor environmental stress-cracking resistance, which leads to brittle failure of the insulation and jacket layers. In contrast, when the density of the bimodal polyethylene is less than, for example, 0.933 g/cm$^3$, the mechanical properties of the articles, as well as the processability of the bimodal polyethylene may be reduced.

In embodiments, the bimodal polyethylene may have a melt index ($I_2$) greater than or equal to 0.3 dg/min, such as greater than or equal to 0.4 dg/min, greater than or equal to 0.5 dg/min, greater than or equal to 0.6 dg/min, greater than or equal to 0.7 dg/min, greater than or equal to 0.8 dg/min, greater than or equal to 0.9 dg/min, greater than or equal to 1.0 dg/min, or greater than or equal to 1.1 dg/min. The bimodal polyethylene may also have a melt index ($I_2$) less than or equal to 1.2 dg/min, such as less than or equal to 1.1 dg/min, less than or equal to 1.0 dg/min, less than or equal to 0.9 dg/min, less than or equal to 0.8 dg/min, less than or equal to 0.7 dg/min, less than or equal to 0.6 dg/min, less than or equal to 0.5 dg/min, or less than or equal to 0.4 dg/min. For example, the bimodal polyethylene may have a melt index ($I_2$) of from 0.3 dg/min to 1.2 dg/min, from 0.3 dg/min to 1.1 dg/min, from 0.3 dg/min to 1.0 dg/min, from 0.3 dg/min to 0.9 dg/min, from 0.3 dg/min to 0.8 dg/min, from 0.3 dg/min to 0.7 dg/min, from 0.3 dg/min to 0.6 dg/min, from 0.3 dg/min to 0.5 dg/min, from 0.3 dg/min to 0.4 dg/min, from 0.4 dg/min to 1.2 dg/min, from 0.4 dg/min to 1.1 dg/min, from 0.4 dg/min to 1.0 dg/min, from 0.4 dg/min to 0.9 dg/min, from 0.4 dg/min to 0.8 dg/min, from 0.4 dg/min to 0.7 dg/min, from 0.4 dg/min to 0.6 dg/min, from 0.4 dg/min to 0.5 dg/min, from 0.5 dg/min to 1.2 dg/min, from 0.5 dg/min to 1.1 dg/min, from 0.5 dg/min to 1.0 dg/min, from 0.5 dg/min to 0.9 dg/min, from 0.5 dg/min to 0.8 dg/min, from 0.5 dg/min to 0.7 dg/min, from 0.5 dg/min to 0.6 dg/min, from 0.6 dg/min to 1.2 dg/min, from 0.6 dg/min to 1.1 dg/min, from 0.6 dg/min to 1.0 dg/min, from 0.6 dg/min to 0.9 dg/min, from 0.6 dg/min to 0.8 dg/min, from 0.6 dg/min to 0.7 dg/min, from 0.7 dg/min to 1.2 dg/min, from 0.7 dg/min to 1.1 dg/min, from 0.7 dg/min to 1.0 dg/min, from 0.7 dg/min to 0.9 dg/min, from 0.7 dg/min to 0.8 dg/min, from 0.8 dg/min to 1.2 dg/min, from 0.8 dg/min to 1.1 dg/min, from 0.8 dg/min to 1.0 dg/min, from 0.8 dg/min to 0.9 dg/min, from 0.9 dg/min to 1.2 dg/min, from 0.9 dg/min to 1.1 dg/min, from 0.9 dg/min to 1.0 dg/min, from 1.0 dg/min to 1.2 dg/min, from 1.0 dg/min to 1.1 dg/min, or from 1.1 dg/min to 1.2 dg/min.

In embodiments, the bimodal polyethylene may have a high load melt index ($I_{21}$) greater than or equal to 25.0 dg/min, such as greater than or equal to 35.0 dg/min, greater than or equal to 45.0 dg/min, greater than or equal to 55.0 dg/min, greater than or equal to 65.0 dg/min, greater than or equal to 75.0 dg/min, greater than or equal to 85.0 dg/min, greater than or equal to 95.0 dg/min, greater than or equal to 105.0 dg/min, or greater than or equal to 115.0 dg/min. The bimodal polyethylene may also have a high load melt index ($I_{21}$) less than or equal to 125.0 dg/min, such as less than or equal to 115.0 dg/min, less than or equal to 105.0 dg/min, less than or equal to 95.0 dg/min, less than or equal to 85.0 dg/min, less than or equal to 75.0 dg/min, less than or equal to 65.0 dg/min, less than or equal to 55.0 dg/min, less than or equal to 45.0 dg/min, or less than or equal to 35.0 dg/min. For example, the bimodal polyethylene may have a high load melt index ($I_{21}$) of from 25.0 dg/min to 125.0 dg/min, from 25.0 dg/min to 115.0 dg/min, from 25.0 dg/min to 105.0 dg/min, from 25.0 dg/min to 95.0 dg/min, from 25.0 dg/min to 85.0 dg/min, from 25.0 dg/min to 75.0 dg/min, from 25.0 dg/min to 65.0 dg/min, from 25.0 dg/min to 55.0 dg/min, from 25.0 dg/min to 45.0 dg/min, from 25.0 dg/min to 35.0 dg/min, from 35.0 dg/min to 125.0 dg/min, from 35.0 dg/min to 115.0 dg/min, from 35.0 dg/min to 105.0 dg/min, from 35.0 dg/min to 95.0 dg/min, from 35.0 dg/min to 85.0 dg/min, from 35.0 dg/min to 75.0 dg/min, from 35.0 dg/min to 65.0 dg/min, from 35.0 dg/min to 55.0 dg/min, from 35.0 dg/min to 45.0 dg/min, from 45.0 dg/min to 125.0 dg/min, from 45.0 dg/min to 115.0 dg/min, from 45.0 dg/min to 105.0 dg/min, from 45.0 dg/min to 95.0 dg/min, from 45.0 dg/min to 85.0 dg/min, from 45.0 dg/min to 75.0 dg/min, from 45.0 dg/min to 65.0 dg/min, from 45.0 dg/min to 55.0 dg/min, from 55.0 dg/min to 125.0 dg/min, from 55.0 dg/min to 115.0 dg/min, from 55.0 dg/min to 105.0 dg/min, from 55.0 dg/min to 95.0 dg/min, from 55.0 dg/min to 85.0 dg/min, from 55.0 dg/min to 75.0 dg/min, from 55.0 dg/min to 65.0 dg/min, from 65.0 dg/min to 125.0 dg/min, from 65.0 dg/min to 115.0 dg/min, from 65.0 dg/min to 105.0 dg/min, from 65.0 dg/min to 95.0 dg/min, from 65.0 dg/min to 85.0 dg/min, from 65.0 dg/min to 75.0 dg/min, from 75.0 dg/min to 125.0 dg/min, from 75.0 dg/min to 115.0 dg/min, from 75.0 dg/min to 105.0 dg/min, from 75.0 dg/min to 95.0 dg/min, from 75.0 dg/min to 85.0 dg/min, from 85.0 dg/min to 125.0 dg/min, from 85.0 dg/min to 115.0 dg/min, from 85.0 dg/min to 105.0 dg/min, from 85.0 dg/min to 95.0 dg/min, from 95.0 dg/min to 125.0 dg/min, from 95.0 dg/min to 115.0 dg/min, from 95.0 dg/min to 105.0 dg/min, from 105.0 dg/min to 125.0 dg/min, from 105.0 dg/min to 115.0 dg/min, or from 115.0 dg/min to 125.0 dg/min.

In embodiments, the bimodal polyethylene may have a melt flow ratio ($MFR_{21}$) greater than or equal to 80.0, such as greater than or equal to 90.0, greater than or equal to 100.0, greater than or equal to 110.0, greater than or equal to 120.0, greater than or equal to 130.0, or greater than or equal to 140.0. The bimodal polyethylene may also have a melt flow ratio ($MFR_{21}$) less than or equal to 150.0, such as less than or equal to 140.0, less than or equal to 130.0, less than or equal to 120.0, less than or equal to 110.0, less than or equal to 100.0, or less than or equal to 90.0. For example, the bimodal polyethylene may have a melt flow ratio ($MFR_{21}$) of from 80.0 to 150.0, from 80.0 to 140.0, from 80.0 to 130.0, from 80.0 to 120.0, from 80.0 to 110.0, from 80.0 to 100.0, from 80.0 to 90.0, from 90.0 to 150.0, from 90.0 to 140.0, from 90.0 to 130.0, from 90.0 to 120.0, from 90.0 to 110.0, from 90.0 to 100.0, from 100.0 to 150.0, from 100.0 to 140.0, from 100.0 to 130.0, from 100.0 to 120.0, from 100.0 to 110.0, from 110.0 to 150.0, from 110.0 to 140.0, from 110.0 to 130.0, from 110.0 to 120.0, from 120.0 to 150.0, from 120.0 to 140.0, from 120.0 to 130.0, from 130.0 to 150.0, from 130.0 to 140.0, or from 140.0 to 150.0. When the melt flow ratio ($MFR_{21}$) of the bimodal polyethylene is less than, for example, 80.0, thermoplastic compositions including the bimodal polyethylene may not have adequate processability to manufacture articles, such as, for example, insulation and jacket layers for wires and cables. Moreover, when the melt flow ratio ($MFR_{21}$) of the bimodal polyethylene is less than, for example, 80.0, insulation and jacket layers including the bimodal polyethylene may not have wire smoothness values necessary for some applications.

In embodiments, the bimodal polyethylene may have a number average molecular weight ($M_n$) greater than or equal to 5,000 g/mol, such as greater than or equal to 10,000 g/mol, greater than or equal to 15,000 g/mol, greater than or equal to 20,000 g/mol, or greater than or equal to 25,000 g/mol. The bimodal polyethylene may also have a number average molecular weight (Me) less than or equal to 30,000 g/mol, such as less than or equal to 25,000 g/mol, less than or equal to 20,000 g/mol, less than or equal to 15,000 g/mol, or less than or equal to 10,000 g/mol. For example, the bimodal polyethylene may have a number average molecular weight (Me) of from 5,000 g/mol to 30,000 g/mol, from 5,000 g/mol to 25,000 g/mol, from 5,000 g/mol to 20,000 g/mol, from 5,000 g/mol to 15,000 g/mol, from 5,000 g/mol to 10,000 g/mol, from 10,000 g/mol to 30,000 g/mol, from 10,000 g/mol to 25,000 g/mol, from 10,000 g/mol to 20,000 g/mol, from 10,000 g/mol to 15,000 g/mol, from 15,000 g/mol to 30,000 g/mol, from 15,000 g/mol to 25,000 g/mol, from 15,000 g/mol to 20,000 g/mol, from 20,000 g/mol to 30,000 g/mol, from 20,000 g/mol to 25,000 g/mol, or from 25,000 g/mol to 30,000 g/mol.

In embodiments, the bimodal polyethylene may have a weight average molecular weight ($M_w$) greater than or equal to 100,000 g/mol, such as greater than or equal to 115,000 g/mol, greater than or equal to 130,000 g/mol, greater than or equal to 145,000 g/mol, or greater than or equal to 160,000 g/mol. The bimodal polyethylene may also have a weight average molecular weight ($M_w$) less than or equal to 175,000 g/mol, such as less than or equal to 160,000 g/mol, less than or equal to 145,000 g/mol, less than or equal to 130,000 g/mol, or less than or equal to 115,000 g/mol. For example, the bimodal polyethylene may have a weight average molecular weight ($M_w$) of from 100,000 g/mol to 175,000 g/mol, from 100,000 g/mol to 160,000 g/mol, from 100,000 g/mol to 145,000 g/mol, from 100,000 g/mol to 130,000 g/mol, from 100,000 g/mol to 115,000 g/mol, from 115,000 g/mol to 175,000 g/mol, from 115,000 g/mol to 160,000 g/mol, from 115,000 g/mol to 145,000 g/mol, from 115,000 g/mol to 130,000 g/mol, from 130,000 g/mol to 175,000 g/mol, from 130,000 g/mol to 160,000 g/mol, from 130,000 g/mol to 145,000 g/mol, from 145,000 g/mol to 175,000 g/mol, from 145,000 g/mol to 160,000 g/mol, or from 160,000 g/mol to 175,000 g/mol.

In embodiments, the bimodal polyethylene may have a z-average molecular weight ($M_z$) greater than or equal to 500,000 g/mol, such as greater than or equal to 700,000 g/mol, greater than or equal to 900,000 g/mol, greater than or equal to 1,100,000 g/mol, greater than or equal to 1,300,000 g/mol, greater than or equal to 1,500,000 g/mol, greater than or equal to 1,700,000 g/mol, greater than or equal to 1,900,000 g/mol, greater than or equal to 2,100,000 g/mol, greater than or equal to 2,300,000 g/mol, or greater than or equal to 2,500,000 g/mol. The bimodal polyethylene may also have a z-average molecular weight ($M_z$) less than or equal to 2,700,000 g/mol, such as less than or equal to 2,500,000 g/mol, less than or equal to 2,300,000 g/mol, less than or equal to 2,100,000 g/mol, less than or equal to 1,900,000 g/mol, less than or equal to 1,700,000 g/mol, less than or equal to 1,500,000 g/mol, less than or equal to 1,300,000 g/mol, less than or equal to 1,100,000 g/mol, less than or equal to 900,000 g/mol, or less than or equal to 700,000 g/mol. For example, the bimodal polyethylene may have a z-average molecular weight ($M_z$) of from 500,000 g/mol to 1,500,000 g/mol, from 500,000 g/mol to 1,300,000 g/mol, from 500,000 g/mol to 1,100,000 g/mol, from 500, 000 g/mol to 900,000 g/mol, from 500,000 g/mol to 700,000 g/mol, from 700,000 g/mol to 1,500,000 g/mol, from 700, 000 g/mol to 1,300,000 g/mol, from 700,000 g/mol to 1,100,000 g/mol, from 700,000 g/mol to 900,000 g/mol, from 900,000 g/mol to 1,500,000 g/mol, from 900,000 g/mol to 1,300,000 g/mol, from 900,000 g/mol to 1,100,000 g/mol, from 1,100,000 g/mol to 1,500,000 g/mol, from 1,100,000 g/mol to 1,300,000 g/mol, or from 1,300,000 g/mol to 1,500,000 g/mol.

In embodiments, the ratio of the weight average molecular weight ($M_w$) of the bimodal polyethylene to the number average molecular weight ($M_n$) of the bimodal polyethylene may be greater than or equal to 10, such as greater than or equal to 12, greater than or equal to 14, greater than or equal to 16, or greater than or equal to 18. The ratio of the weight average molecular weight ($M_w$) of the bimodal polyethylene to the number average molecular weight ($M_n$) of the bimodal polyethylene may also be less than or equal to 20, such as less than or equal to 18, less than or equal to 16, less than or equal to 14, or less than or equal to 12. For example, the ratio of the weight average molecular weight ($M_w$) of the bimodal polyethylene to the number average molecular weight ($M_n$) of the bimodal polyethylene may be from 10 to 20, from 10 to 18, from 10 to 16, from 10 to 14, from 10 to 12, from 12 to 20, from 12 to 18, from 12 to 16, from 12 to 14, from 14 to 20, from 14 to 18, from 14 to 16, from 16 to 20, from 16 to 18, or from 18 to 20. When the ratio of the weight average molecular weight ($M_w$) of the bimodal polyethylene to the number average molecular weight ($M_n$) of the bimodal polyethylene is less than, for example, 10, thermoplastic compositions including the bimodal polyethylene may not have adequate processability to manufacture articles, such as, for example, insulation and jacket layers for wires and cables. Moreover, when the ratio of the weight average molecular weight ($M_w$) of the bimodal polyethylene to the number average molecular weight ($M_n$) of the bimodal polyethylene is less than, for example, 10, insulation and jacket layers including the bimodal polyethylene may not have wire smoothness values necessary for some applications.

In embodiments, the ratio of the z-average molecular weight ($M_z$) of the bimodal polyethylene to the weight average molecular weight ($M_w$) of the bimodal polyethylene may be greater than or equal to 4, such as greater than or equal to 6, greater than or equal to 8, greater than or equal to 10, greater than or equal to 12, or greater than or equal to 14. The ratio of the z-average molecular weight ($M_z$) of the bimodal polyethylene to the weight average molecular weight ($M_w$) of the bimodal polyethylene may also be less than or equal to 16, such as less than or equal to 14, less than or equal to 12, less than or equal to 10, less than or equal to 8, or less than or equal to 6. For example, the ratio of the z-average molecular weight ($M_z$) of the bimodal polyethylene to the weight average molecular weight ($M_w$) of the bimodal polyethylene may be from 4 to 16, from 4 to 14, from 4 to 12, from 4 to 10, from 4 to 8, from 4 to 6, from 6 to 16, from 6 to 14, from 6 to 12, from 6 to 10, from 6 to 8, from 8 to 16, from 8 to 14, from 8 to 12, from 8 to 10, from 10 to 16, from 10 to 14, from 10 to 12, from 12 to 16, from 12 to 14, or from 14 to 16.

In embodiments, the low molecular weight component of the bimodal polyethylene may have a short chain branching distribution ($SCBD_1$) greater than or equal to 0.1, such as greater than or equal to 1.0, greater than or equal to 2.0, greater than or equal to 3.0, greater than or equal to 4.0, greater than or equal to 5.0, greater than or equal to 6.0, greater than or equal to 7.0, greater than or equal to 8.0, or greater than or equal to 9.0. The low molecular weight component of the bimodal polyethylene may also have a short chain branching distribution ($SCBD_1$) less than or equal to 10.0, such as less than or equal to 9.0, less than or equal to 8.0, less than or equal to 7.0, less than or equal to 6.0, less than or equal to 5.0, less than or equal to 4.0, less than or equal to 3.0, less than or equal to 2.0, or less than or equal to 1.0. For example, the low molecular weight component of the bimodal polyethylene may have a short chain branching distribution ($SCBD_1$) of from 0.1 to 10.0, from 0.1 to 9.0, from 0.1 to 8.0, from 0.1 to 7.0, from 0.1 to 6.0, from 0.1 to 5.0, from 0.1 to 4.0, from 0.1 to 3.0, from 0.1 to 2.0, from 0.1 to 1.0, from 1.0 to 10.0, from 1.0 to 9.0, from 1.0 to 8.0, from 1.0 to 7.0, from 1.0 to 6.0, from 1.0 to 5.0, from 1.0 to 4.0, from 1.0 to 3.0, from 1.0 to 2.0, from 2.0 to 10.0, from 2.0 to 9.0, from 2.0 to 8.0, from 2.0 to 7.0, from 2.0 to 6.0, from 2.0 to 5.0, from 2.0 to 4.0, from 2.0 to 3.0, from 3.0 to 10.0, from 3.0 to 9.0, from 3.0 to 8.0, from 3.0 to 7.0, from 3.0 to 6.0, from 3.0 to 5.0, from 3.0 to 4.0, from 4.0 to 10.0, from 4.0 to 9.0, from 4.0 to 8.0, from 4.0 to 7.0, from 4.0 to 6.0, from 4.0 to 5.0, from 5.0 to 10.0, from 5.0 to 9.0, from 5.0 to 8.0, from 5.0 to 7.0, from 5.0 to 6.0, from 6.0 to 10.0, from 6.0 to 9.0, from 6.0 to 8.0, from 6.0 to 7.0, from 7.0 to 10.0, from 7.0 to 9.0, from 7.0 to 8.0, from 8.0 to 10.0, from 8.0 to 9.0, or form 9.0 to 10.0.

In embodiments, the high molecular weight component of the bimodal polyethylene may have a short chain branching distribution ($SCBD_2$) greater than or equal to 3.0, such as greater than or equal to 4.0, greater than or equal to 5.0, greater than or equal to 6.0, greater than or equal to 7.0, greater than or equal to 8.0, greater than or equal to 9.0, greater than or equal to 10.0, greater than or equal to 11.0, greater than or equal to 12.0, greater than or equal to 13.0, greater than or equal to 14.0, greater than or equal to 15.0, greater than or equal to 16.0, greater than or equal to 17.0, greater than or equal to 18.0, or greater than or equal to 19.0. The high molecular weight component of the bimodal polyethylene may also have a short chain branching distribution ($SCBD_2$) less than or equal to 20.0, such as less than or equal to 19.0, less than or equal to 18.0, less than or equal to 17.0, less than or equal to 16.0, less than or equal to 15.0, less than or equal to 14.0, less than or equal to 13.0, less than or equal to 12.0, less than or equal to 11.0, less than or equal to 10.0, less than or equal to 9.0, less than or equal to 8.0, less than or equal to 7.0, less than or equal to 6.0, less than or equal to 5.0, or less than or equal to 4.0. For example, the high molecular weight component of the bimodal polyethylene may have a short chain branching distribution ($SCBD_2$) of from 3.0 to 20.0, from 3.0 to 19.0, from 3.0 to 18.0, from 3.0 to 17.0, from 3.0 to 16.0, from 3.0 to 15.0, from 3.0 to 14.0, from 3.0 to 13.0, from 3.0 to 12.0, from 3.0 to 11.0, from 3.0 to 10.0, from 3.0 to 9.0, from 3.0 to 8.0, from 3.0 to 7.0, from 3.0 to 6.0, from 5.0 to 5.0, from 3.0 to 4.0, from 4.0 to 20.0, from 4.0 to 19.0, from 4.0 to 18.0, from 4.0 to 17.0, from 4.0 to 16.0, from 4.0 to 15.0, from 4.0 to 14.0, from 4.0 to 13.0, from 4.0 to 12.0, from 4.0 to 11.0, from 4.0 to 10.0, from 4.0 to 9.0, from 4.0 to 8.0, from 4.0 to 7.0, from 4.0 to 6.0, from 4.0 to 5.0, from 5.0 to 20.0, from 5.0 to 19.0, from 5.0 to 18.0, from 5.0 to 17.0, from 5.0 to 16.0, from 5.0 to 15.0, from 5.0 to 14.0, from 5.0 to 13.0, from 5.0 to 12.0, from 5.0 to 11.0, from 5.0 to 10.0, from 5.0 to 9.0, from 5.0 to 8.0, from 5.0 to 7.0, from 5.0 to 6.0, from 6.0 to 20.0, from 6.0 to 19.0, from 6.0 to 18.0, from 6.0 to 17.0, from 6.0 to 16.0, from 6.0 to 15.0, from 6.0 to 14.0, from 6.0 to 13.0, from 6.0 to 12.0, from 6.0 to 11.0, from 6.0 to 10.0, from 6.0 to 9.0, from 6.0 to 8.0, from 6.0 to 7.0, from 7.0 to 20.0, from 7.0 to 19.0, from 7.0 to 18.0, from 7.0 to 17.0, from 7.0 to 16.0, from 7.0 to 15.0, from 7.0 to 14.0, from 7.0 to 13.0, from 7.0 to 12.0, from 7.0 to 11.0, from 7.0 to 10.0, from 7.0 to 9.0, from 7.0 to 8.0, from 8.0 to 20.0, from 8.0 to 19.0, from 8.0 to 18.0, from 8.0 to 17.0, from 8.0 to 16.0, from 8.0 to 15.0, from 8.0 to 14.0, from 8.0 to 13.0, from 8.0 to 12.0, from 8.0 to 11.0, from 8.0 to 10.0, from 8.0 to 9.0, from 9.0 to 20.0, from 9.0 to 19.0, from 9.0 to 18.0, from 9.0 to 17.0, from 9.0 to 16.0, from 9.0 to 15.0, from 9.0 to 14.0, from 9.0 to 13.0, from 9.0 to 12.0, from 9.0 to 11.0, from 9.0 to 10.0, from 10.0 to 20.0, from 10.0 to 19.0, from 10.0 to 18.0, from 10.0 to 17.0, from 10.0 to 16.0, from 10.0 to 15.0, from 10.0 to 14.0, from 10.0 to 13.0, from 10.0 to 12.0, from 10.0 to 11.0, from 11.0 to 20.0, from 11.0 to 19.0, from 11.0 to 18.0, from 11.0 to 17.0, from 11.0 to 16.0, from 11.0 to 15.0, from 11.0 to 14.0, from 11.0 to 13.0, from 11.0 to 12.0, from 12.0 to 20.0, from 12.0 to 19.0, from 12.0 to 18.0, from 12.0 to 17.0, from 12.0 to 16.0, from 12.0 to 15.0, from 12.0 to 14.0, from 12.0 to 13.0, from 13.0 to 20.0, from 13.0 to 19.0, from 13.0 to 18.0, from 13.0 to 17.0, from 13.0 to 16.0, from 13.0 to 15.0, from 13.0 to 14.0, from 14.0 to 20.0, from 14.0 to 19.0, from 14.0 to 18.0, from 14.0 to 17.0, from 14.0 to 16.0, from 14.0 to 15.0, from 15.0 to 20.0, from 15.0 to 19.0, from 15.0 to 18.0, from 15.0 to 17.0, from 15.0 to 16.0, from 16.0 to 20.0, from 16.0 to 19.0, from 16.0 to 18.0, from 16.0 to 17.0, from 17.0 to 20.0, from 17.0 to 19.0, from 17.0 to 18.0, from 18.0 to 20.0, from 18.0 to 19.0, or from 19.0 to 20.0.

In embodiments, the bimodal polyethylene may have a reverse comonomer distribution. Put more simply, in embodiments a ratio of the short chain branching distribution of the high molecular weight component ($SCBD_2$) of the bimodal polyethylene to the short chain branching distribution of the low molecular weight component ($SCBD_1$) of the bimodal polyethylene may be greater than 1.0. Without being bound by any particular theory, it is believed that bimodal polyethylene having a reverse comonomer distribution may have improved environmental stress cracking resistance (ESCR) and balanced mechanical properties compared to bimodal polyethylene having a normal or flat comonomer distribution.

In embodiments, the complex viscosity of the bimodal polyethylene at 190° C. and a frequency of 0.1 rad/s may be greater than or equal to 5,000 Pa·s, such as greater than or equal to 10,000 Pa·s, greater than or equal to 15,000 Pa·s, greater than or equal to 20,000 Pa·s, greater than or equal to 25,000 Pa·s, or greater than or equal to 30,000 Pa·s. The complex viscosity of the bimodal polyethylene at 190° C. and a frequency of 0.1 rad/s may also be less than or equal to 35,000 Pa·s, such as less than or equal to 30,000 Pa·s, less than or equal to 25,000 Pa·s, less than or equal to 20,000 Pa·s, less than or equal to 15,000 Pa·s, or less than or equal to 10,000 Pa·s. For example, the complex viscosity of the bimodal polyethylene at 190° C. and a frequency of 0.1 rad/s may be from 5,000 Pa·s to 35,000 Pa·s, from 5,000 Pa·s to 30,000 Pa·s, from 5,000 Pa·s to 25,000 Pa·s, from 5,000 Pa·s to 20,000 Pa·s, from 5,000 Pa·s to 15,000 Pa·s, from 5,000 Pa·s to 10,000 Pa·s, from 10,000 Pa·s to 35,000 Pa·s, from 10,000 Pa·s to 30,000 Pa·s, from 10,000 Pa·s to 25,000 Pa·s, from 10,000 Pa·s to 20,000 Pa·s, from 10,000 Pa·s to 15,000 Pa·s, from 15,000 Pa·s to 35,000 Pa·s, from 15,000 Pa·s to 30,000 Pa·s, from 15,000 Pa·s to 25,000 Pa·s, from 15,000 Pa·s to 20,000 Pa·s, from 20,000 Pa·s to 35,000 Pa·s, from 20,000 Pa·s to 30,000 Pa·s, from 20,000 Pa·s to 25,000 Pa·s, from 25,000 Pa·s to 35,000 Pa·s, from 25,000 Pa·s to 30,000 Pa·s, or from 30,000 Pa·s to 35,000 Pa·s.

In embodiments, the complex viscosity of the bimodal polyethylene at 190° C. and a frequency of 1.0 rad/s may be greater than or equal to 5,000 Pa·s, such as greater than or equal to 7,500 Pa·s, greater than or equal to 10,000 Pa·s, greater than or equal to 12,500 Pa·s, greater than or equal to 15,000 Pa·s, or greater than or equal to 17,500 Pa·s. The complex viscosity of the bimodal polyethylene at 190° C. and a frequency of 1.0 rad/s may also be less than or equal to 20,000 Pa·s, such as less than or equal to 17,500 Pa·s, less than or equal to 15,000 Pa·s, less than or equal to 12,500 Pa·s, less than or equal to 10,000 Pa·s, or less than or equal to 7,500 Pa·s. For example, the complex viscosity of the bimodal polyethylene at 190° C. and a frequency of 1.0 rad/s may be from 5,000 Pa·s to 20,000 Pa·s, from 5,000 Pa·s to 17,500 Pa·s, from 5,000 Pa·s to 15,000 Pa·s, from 5,000 Pa·s to 12,500 Pa·s, from 5,000 Pa·s to 10,000 Pa·s, from 5,000 Pa·s to 7,500 Pa·s, from 7,500 Pa·s to 20,000 Pa·s, from 7,500 Pa·s to 17,500 Pa·s, from 7,500 Pa·s to 15,000 Pa·s, from 7,500 Pa·s to 12,500 Pa·s, from 7,500 Pa·s to 10,000 Pa·s, from 10,000 Pa·s to 20,000 Pa·s, from 10,000 Pa·s to 17,500 Pa·s, from 10,000 Pa·s to 15,000 Pa·s, from 12,500 Pa·s to 15,000 Pa·s, from 12,500 Pa·s to 20,000 Pa·s, from 12,500 Pa·s to 17,500 Pa·s, from 12,500 Pa·s to 15,000 Pa·s, from 15,000 Pa·s to 20,000 Pa·s, from 5,000 Pa·s to 17,500 Pa·s, or from 17,500 Pa·s to 20,000 Pa·s.

In embodiments, the complex viscosity of the bimodal polyethylene at 190° C. and a frequency of 10 rad/s may be greater than or equal to 1,000 Pa·s, greater than or equal to 2,000 Pa·s, such as greater than or equal to 3,000 Pa·s, greater than or equal to 4,000 Pa·s, greater than or equal to 5,000 Pa·s, greater than or equal to 6,000 Pa·s, greater than or equal to 7,000 Pa·s, greater than or equal to 8,000 Pa·s, or greater than or equal to 9,000 Pa·s. The complex viscosity of the bimodal polyethylene at 190° C. and a frequency of 10 rad/s may also be less than or equal to 10,000 Pa·s, such as less than or equal to 9,000 Pa·s, less than or equal to 8,000 Pa·s, less than or equal to 7,000 Pa·s, less than or equal to 6,000 Pa·s, less than or equal to 5,000 Pa·s, less than or equal to 4,000 Pa·s, less than or equal to 3,000 Pa·s, or less than or equal to 2,000 Pa·s. For example, the complex viscosity of the bimodal polyethylene at 190° C. and a frequency of 10 rad/s may be from 1,000 Pa·s to 10,000 Pa·s, from 1,000 Pa·s to 9,000 Pa·s, from 1,000 Pa·s to 8,000 Pa·s, from 1,000 Pa·s to 7,000 Pa·s, from 1,000 Pa·s to 6,000 Pa·s, from 1,000 Pa·s to 5,000 Pa·s, from 1,000 Pa·s to 4,000 Pa·s, from 1,000 Pa·s to 3,000 Pa·s, from 1,000 Pa·s to 2,000 Pa·s, from 2,000 Pa·s to 10,000 Pa·s, from 2,000 Pa·s to 9,000 Pa·s, from 2,000 Pa·s to 8,000 Pa·s, from 2,000 Pa·s to 7,000 Pa·s, from 2,000 Pa·s to 6,000 Pa·s, from 2,000 Pa·s to 5,000 Pa·s, from 2,000 Pa·s to 4,000 Pa·s, from 2,000 Pa·s to 3,000 Pa·s, from 3,000 Pa·s to 10,000 Pa·s, from 3,000 Pa·s to 9,000 Pa·s, from 3,000 Pa·s to 8,000 Pa·s, from 3,000 Pa·s to 7,000 Pa·s, from 3,000 Pa·s to 6,000 Pa·s, from 3,000 Pa·s to 5,000 Pa·s, from 3,000 Pa·s to 4,000 Pa·s, from 4,000 Pa·s to 10,000 Pa·s, from 4,000 Pa·s to 9,000 Pa·s, from 4,000 Pa·s to 8,000 Pa·s, from 4,000 Pa·s to 7,000 Pa·s, from 4,000 Pa·s to 6,000 Pa·s, from 4,000 Pa·s to 5,000 Pa·s, from 5,000 Pa·s to 10,000 Pa·s, from 5,000 Pa·s to 9,000 Pa·s, from 5,000 Pa·s to 8,000 Pa·s, from 5,000 Pa·s to 7,000 Pa·s, from 5,000 Pa·s to 6,000 Pa·s, from 6,000 Pa·s to 10,000 Pa·s, from 6,000 Pa·s to 9,000 Pa·s, from 6,000 Pa·s to 8,000 Pa·s, from 6,000 Pa·s to 7,000 Pa·s, from 7,000 Pa·s to 10,000 Pa·s, from 7,000 Pa·s to 9,000 Pa·s, from 7,000 Pa·s to 8,000 Pa·s, from 8,000 Pa·s to 10,000 Pa·s, from 8,000 Pa·s to 9,000 Pa·s, or from 9,000 Pa·s to 10,000 Pa·s.

In embodiments, the complex viscosity of the bimodal polyethylene at 190° C. and a frequency of 100 rad/s may be greater than or equal to 500 Pa·s, such as greater than or equal to 800 Pa·s, greater than or equal to 1,100 Pa·s, greater than or equal to 1,400 Pa·s, or greater than or equal to 1,700 Pa·s. The complex viscosity of the bimodal polyethylene at 190° C. and a frequency of 100 rad/s may also be less than or equal to 2,000 Pa·s, such as less than or equal to 1,700 Pa·s, less than or equal to 1,400 Pa·s, less than or equal to 1,100 Pa·s, or less than or equal to 800 Pa·s. For example, the complex viscosity of the bimodal polyethylene at 190° C. and a frequency of 100 rad/s may be from 500 Pa·s to 2,000 Pa·s, from 500 Pa·s to 1,700 Pa·s, from 500 Pa·s to 1,400 Pa·s, from 500 Pa·s to 1,100 Pa·s, from 500 Pa·s to 800 Pa·s, from 800 Pa·s to 2,000 Pa·s, from 800 Pa·s to 1,700 Pa·s, from 800 Pa·s to 1,400 Pa·s, from 800 Pa·s to 1,100 Pa·s, from 1,100 Pa·s to 2,000 Pa·s, from 1,100 Pa·s to 1,700 Pa·s, from 1,100 Pa·s to 1,400 Pa·s, from 1,400 Pa·s to 2,000 Pa·s, from 1,400 Pa·s to 1,700 Pa·s, or from 1,700 Pa·s to 2,000 Pa·s.

In embodiments, the ratio of the complex viscosity of the bimodal polyethylene at 190° C. and a frequency of 0.1 rad/s to the complex viscosity of the bimodal polyethylene at 190° C. and a frequency of 100 rad/s (i.e., Shear Thinning Index (SHI)) may be greater than or equal to 5.0, such as greater than or equal to 7.5, greater than or equal to 10.0, greater than or equal to 12.5, greater than or equal to 15.0, or greater than or equal to 17.5. The ratio of the complex viscosity of the bimodal polyethylene at 190° C. and a frequency of 0.1 rad/s to the complex viscosity of the bimodal polyethylene at 190° C. and a frequency of 100 rad/s may also be less than or equal to 20.0, such as less than or equal to 17.5, less than or equal to 15.0, less than or equal to 12.5, less than or equal to 10.0, or less than or equal to 7.5. For example, the ratio of the complex viscosity of the bimodal polyethylene at 190° C. and a frequency of 0.1 rad/s to the complex viscosity of the bimodal polyethylene at 190° C. and a frequency of 100 rad/s may be from 5.0 to 20.0, from 5.0 to 17.5, from 5.0 to 15.0, from 5.0 to 12.5, from 5.0 to 10.0, from 5.0 to 7.5, from 7.5 to 20.0, from 7.5 to 17.5, from 7.5 to 15.0, from 7.5 to 12.5, from 7.5 to 10.0, from 10.0 to 20.0, from 10.0 to 17.5, from 10.0 to 15.0, from 10.0 to 12.5, from 12.5 to 20.0, from 12.5 to 17.5, from 12.5 to 15.0, from 15.0 to 20.0, from 15.0 to 17.5, or from 17.5 to 20.0. When the shear thinning index (SHI) of the bimodal polyethylene is less than, for example, 5.0, thermoplastic compositions including the bimodal polyethylene may not have adequate processability to manufacture articles, such as, for example, insulation and jacket layers for wires and cables.

In embodiments, the bimodal polyethylene may be a polymerized reaction product of an ethylene monomer and at least one $C_3$-$C_{12}$ α-olefin comonomer. For example, embodiments of the bimodal polyethylene composition may be a polymerized reaction product of an ethylene monomer and 1-butene, 1-hexene, or both. Alternatively, embodiments of the bimodal polyethylene composition may be a polymerized reaction product of an ethylene monomer and 1-butene, 1-octene, or both. Embodiments of the bimodal polyethylene may also be a polymerized reaction product of an ethylene monomer and 1-hexene, 1-octene, or both. In some embodiments, the $C_3$-$C_{12}$ α-olefin comonomer may not be propylene. That is, the at least one $C_3$-$C_{12}$ α-olefin comonomer may be substantially free of propylene. The term "substantially free" of a compound means the material or mixture comprises less than 1.0 wt. % of the compound. For example, the at least one $C_3$-$C_{12}$ α-olefin comonomer, which may be substantially free of propylene, may comprise less than 1.0 wt. % propylene, such as less than 0.8 wt. % propylene, less than 0.6 wt. % propylene, less than 0.4 wt. % propylene, or less than 0.2 wt. % propylene.

In embodiments, the bimodal polyethylene may be produced with a catalyst system in a single reactor. As used herein, a "catalyst system" may comprise a main catalyst, a trim catalyst, and, optionally, at least one activator. Catalyst systems may also include other components, such as supports, and are not limited to a main catalyst, a trim catalyst, and, optionally, at least one activator. Embodiments of the catalyst system may comprise a main catalyst and a metallocene trim catalyst. Embodiments of the catalyst system may also comprise one or more additives commonly used in the art of olefin polymerization. For example, embodiments of the catalyst system may comprise one or more continuity additives, flow aids, and anti-static aids. In embodiments, the reactor may be a gas phase reactor, although slurry phase reactors may also be used.

Embodiments of the catalyst system may comprise at least one catalyst for producing a high molecular weight fraction of the bimodal polyethylene by polymerization (sometimes referred to herein as an "HMW catalyst"), and at least one catalyst compound for producing a low molecular weight fraction of the bimodal polyethylene by polymerization (sometimes referred to herein as an "LMW catalyst").

The HMW catalyst and the LMW catalyst may have different hydrogen responses. That is, the change in average molecular weight of a polyethylene made by each of the catalysts may be different when the molar ratio of hydrogen gas to ethylene ($H_2/C_2$ molar ratio) is changed. The term "high hydrogen response" refers to a catalyst that displays a relatively large change in the average molecular weight of a polyethylene when the $H_2/C_2$ molar ratio is changed by a set amount. The term "low hydrogen response" refers to a catalyst that displays a relatively low change in average molecular weight of polyethylene when the $H_2/C_2$ molar ratio is changed by the same set amount.

The HMW catalyst and the LMW catalyst may have different comonomer responses. That is, the comonomer content, such as weight percent, of a polyethylene made by each of the catalyst compounds may be different. The term "good incorporator" refers to a catalyst that displays a relatively high degree of comonomer incorporation, while a "poor incorporator" enchains relatively less comonomer. For catalyst systems employing a relatively good incorporator HMW catalyst and a relatively poor incorporator LMW catalyst, a "reverse comonomer distribution" is produced with higher comonomer content in the HMW component. Conversely, a good incorporator LMW catalyst used with a poor incorporator HMW catalyst produces a "normal comonomer distribution."

Embodiments of the catalyst system may be referred to as a "bimodal catalyst system." Such a catalyst system produces a bimodal polyethylene composition having separate, identifiable high molecular weight and low molecular weight distributions. The term "bimodal catalyst system" may comprise any formulation, mixture, or system that comprises at least two different catalyst compounds, each having the same or a different metal group, but generally different ligands or catalyst structure, including a "dual catalyst." Alternatively, each different catalyst compound of the bimodal catalyst system resides on a single support particle, in which case a dual catalyst is considered to be a supported catalyst. However, the term "bimodal catalyst system" also broadly comprises a system or mixture in which one of the catalysts resides on one collection of support particles, and another catalyst resides on another collection of support particles. In such embodiments, the two supported catalysts are introduced to a single reactor, either simultaneously or sequentially, and polymerization is conducted in the presence of the two collections of supported catalysts. Alternatively, the bimodal catalyst system may comprise a mixture of unsupported catalysts in slurry form.

Embodiments of the catalyst system may comprise a main catalyst and a trim catalyst. In such embodiments, the main catalyst comprises at least one catalyst compound (the "main catalyst compound") and a support, and may also comprise an activator, and/or any other additives such as previously described. The main catalyst may be delivered as a slurry in a hydrocarbon diluent, such as mineral oil. The trim catalyst comprises a trim catalyst compound. This trim catalyst compound may also be present in the main catalyst system. The trim catalyst may also comprise a solvent, such as a hydrocarbon, as well as other additives.

Embodiments of the trim catalyst compound may comprise a molecular catalyst compound, such as, for example, a metallocene catalyst compound. In some embodiments, the trim catalyst may be employed for producing a low molecular weight polymer fraction. In such embodiments, the main catalyst may be employed for producing a high molecular weight polymer fraction.

Embodiments of the main catalyst compound may comprise one or more Group 15 metal containing catalyst compounds. The Group 15 metal containing compound may generally comprise a Group 3 to 14 metal atom, or a Group 3 to 7, or a Group 4 to 6, or a Group 4 metal atom bound to at least one leaving group and at least two Group 15 atoms, at least one of which is also bound to a Group 15 or 16 atom through another group. At least one of the Group 15 atoms may be bound to a Group 15 or 16 atom through another group which may be a $C_1$ to $C_{20}$ hydrocarbon group, a heteroatom containing group, silicon, germanium, tin, lead, or phosphorus, wherein the Group 15 or 16 atom may also be bound to nothing or a hydrogen, a Group 14 atom containing group, a halogen, or a heteroatom containing group, and wherein each of the two Group 15 atoms are also bound to a cyclic group and may optionally be bound to hydrogen, a halogen, a heteroatom or a hydrocarbyl group, or a heteroatom containing group.

The Group 15 metal containing compound may be represented by the formulae:

Formula 1

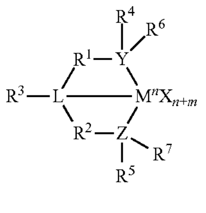

-continued

Formula 2

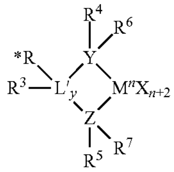

wherein M is a Group 3 to 12 transition metal or a Group 13 or 14 main group metal, or a Group 4, 5, or 6 metal, or a Group 4 metal, or zirconium, titanium or hafnium, and each X is independently a leaving group. X may be an anionic leaving group. X may be hydrogen, a hydrocarbyl group, a heteroatom or a halogen. X may be an alkyl, y may be 0 or 1 (when y is 0 group L' is absent), n is the oxidation state of M, which may be +3, +4, or +5, or may be +4, m is the formal charge of the YZL or the YZL' ligand, which may be 0, −1, −2 or −3, or may be −2, L is a Group 15 or 16 element, preferably nitrogen, L' is a Group 15 or 16 element or Group 14 containing group, preferably carbon, silicon or germanium, Y is a Group 15 element, preferably nitrogen or phosphorus, and more preferably nitrogen, Z is a Group 15 element, preferably nitrogen or phosphorus, and more preferably nitrogen, $R^1$ and $R^2$ are independently a $C_1$ to $C_{20}$ hydrocarbon group, a heteroatom containing group having up to twenty carbon atoms, silicon, germanium, tin, lead, halogen or phosphorus, preferably a $C_2$ to $C_{20}$ alkyl, aryl or aralkyl group, more preferably a linear, branched or cyclic $C_2$ to $C_{20}$ alkyl group, most preferably a $C_2$ to $C_6$ hydrocarbon group. $R^1$ and $R^2$ may also be interconnected to each other, $R^3$ is absent or a hydrocarbon group, hydrogen, a halogen, a heteroatom containing group, preferably a linear, cyclic or branched alkyl group having 1 to 20 carbon atoms, more preferably $R^3$ is absent, hydrogen or an alkyl group, and most preferably hydrogen, $R^4$ and $R^5$ are independently an alkyl group, an aryl group, substituted aryl group, a cyclic alkyl group, a substituted cyclic alkyl group, a cyclic aralkyl group, a substituted cyclic aralkyl group or multiple ring system, preferably having up to 20 carbon atoms, more preferably between 3 and 10 carbon atoms, and even more preferably a $C_1$ to $C_{20}$ hydrocarbon group, a $C_1$ to $C_{20}$ aryl group or a $C_1$ to $C_{20}$ aralkyl group, or a heteroatom-containing group, for example $PR_3$ where R is an alkyl group, $R^1$ and $R^2$ may be interconnected to each other, and/or $R^4$ and $R^5$ may be interconnected to each other, $R^6$ and $R^7$ are independently absent, or hydrogen, an alkyl group, halogen, heteroatom or a hydrocarbyl group, preferably a linear, cyclic or branched alkyl group having 1 to 20 carbon atoms, more preferably absent, and *R is absent, or is hydrogen, a Group 14 atom containing group, a halogen, or a heteroatom containing group.

By "formal charge of the YZL or YZL' ligand," it is meant the charge of the entire ligand absent the metal and the leaving groups X.

By "$R^1$ and $R^2$ may also be interconnected," it is meant that $R^1$ and $R^2$ may be directly bound to each other or may be bound to each other through other groups. By "$R^4$ and $R^5$ may also be interconnected," it is meant that $R^4$ and $R^5$ may be directly bound to each other or may be bound to each other through other groups.

Alkyl groups may be linear or branched alkyl radicals, or alkenyl radicals, alkynyl radicals, cycloalkyl radicals or aryl radicals, acyl radicals, aroyl radicals, alkoxy radicals, aryloxy radicals, alkylthio radicals, dialkylamino radicals, alkoxycarbonyl radicals, aryloxycarbonyl radicals, carbamoyl radicals, alkyl- or dialkyl-carbamoyl radicals, acyloxy radicals, acylamino radicals, aroylamino radicals, straight, branched or cyclic, alkylene radicals, or combination thereof. An aralkyl group is defined to be a substituted aryl group.

$R^4$ and $R^5$ may be independently a group represented by the following Formula 3:

Formula 3

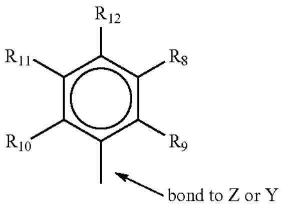

wherein $R^8$ to $R^{12}$ are each independently hydrogen, a $C_1$ to $C_{40}$ alkyl group, a halide, a heteroatom, a heteroatom containing group containing up to 40 carbon atoms, preferably a $C_1$ to $C_{20}$ linear or branched alkyl group, preferably a methyl, ethyl, propyl or butyl group, any two R groups may form a cyclic group and/or a heterocyclic group. The cyclic groups may be aromatic. $R^9$, $R^{10}$, and $R^{12}$ may be independently a methyl, ethyl, propyl or butyl group (including all isomers). In a preferred embodiment any 3 of the R groups of Formula 3 may be methyl groups, and any 2 of the other R groups of Formula 3 may be hydrogen. In a preferred embodiment of the invention, $R^9$, $R^{10}$, and $R^{12}$ are methyl, and $R^8$ and $R^{11}$ are hydrogen.

$R^4$ and $R^5$ may be both a group represented by the following Formula 4:

Formula 4

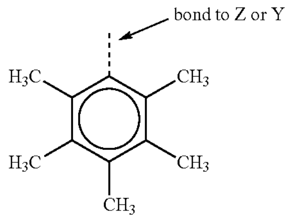

where M is a Group 4 metal, preferably zirconium, titanium or hafnium, and even more preferably zirconium; each of L, Y, and Z is nitrogen; each of $R^1$ and $R^2$ is $—CH_2—CH_2—$; $R^3$ is hydrogen; and $R^6$ and $R^7$ are absent.

The Group 15 and metal containing compound may be Compound 1 (also referred to as "bis(arylamido)Zr dibenzyl" represented below:

Compound 1

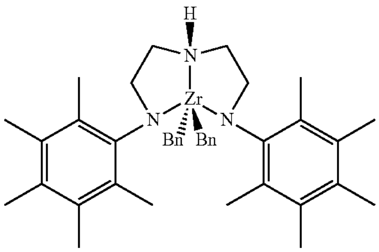

In the representation of Compound 1, "Bn" denotes a benzyl group.

Group 15 and metal containing catalyst compounds may be made by methods known in the art. In some cases, the methods disclosed in European Patent Application Publication No. EP 0 893 454 A1, U.S. Pat. No. 5,889,128 and the references cited in U.S. Pat. No. 5,889,128 are suitable.

In some embodiments, direct synthesis of these compounds includes reacting the neutral ligand, (for example YZL or YZL' of Formula 1 or 2) with $M^nX_n$ (M is a Group 3 to 14 metal, n is the oxidation state of M, each X is an anionic group, such as halide), in a non-coordinating or weakly coordinating solvent (such as ether, toluene, xylene, benzene, methylene chloride, and/or hexane or other solvent having a boiling point above 60° C.), at 20 to 150° C. (such as 20 to 100° C.), for 24 hours or more, then treating the mixture with an excess (such as four or more equivalents) of an alkylating agent, such as methyl magnesium bromide in ether. The magnesium salts are removed by filtration, and the metal complex isolated by standard techniques.

The Group 15 and metal containing compound may be made by a method comprising reacting a neutral ligand (for example YZL or YZL' of Formula 1 or 2) with a compound represented by the formula $M^nX_n$ (where M is a Group 3 to 14 metal, n is the oxidation state of M, and each X is an anionic leaving group) in a non-coordinating or weakly coordinating solvent, at 20° C. or above (preferably at 20 to 100° C.), then treating the mixture with an excess of an alkylating agent, then recovering the metal complex. The solvent may have a boiling point above 60° C., such as toluene, xylene, benzene, and/or hexane. The solvent may comprise ether and/or methylene chloride.

Generally, metallocene compounds may include half and full sandwich compounds having one or more ligands bonded to at least one metal atom. Typical metallocene compounds are generally described as containing one or more ligand(s) and one or more leaving group(s) bonded to at least one metal atom.

The ligands are generally represented by one or more open, acyclic, or fused ring(s) or ring system(s) or a combination thereof. These ligands, preferably the ring(s) or ring system(s) may be composed of atoms selected from Groups 13 to 16 atoms of the Periodic Table of Elements. The atoms may be selected from the group consisting of carbon, nitrogen, oxygen, silicon, sulfur, phosphorous, germanium, boron and aluminum or a combination thereof. The ring(s) or ring system(s) may be composed of carbon atoms such as but not limited to those cyclopentadienyl ligands or cyclopentadienyl-type ligand structures or other similar functioning ligand structure such as a pentadiene, a cyclooctatetraendiyl or an imide ligand. The metal atom may be selected from Groups 3 through 15 and the lanthanide or actinide series of the Periodic Table of Elements. The metal may be a transition metal from Groups 4 through 12, or Groups 4, 5 and 6, or the transition metal is from Group 4.

The catalyst composition may include one or more metallocene catalyst compounds represented by the Formula 5:

$$L^A L^B M Q_n \quad \text{Formula 5}$$

where M is a metal atom from the Periodic Table of the Elements and may be a Group 3 to 12 metal or from the lanthanide or actinide series of the Periodic Table of Elements. M may be a Group 4, 5 or 6 transition metal, or M is a Group 4 transition metal, or M is zirconium, hafnium or titanium. The ligands, $L^A$ and $L^B$, may be open, acyclic or fused ring(s) or ring system(s) and may be any ancillary ligand system, including unsubstituted or substituted, cyclopentadienyl ligands or cyclopentadienyl-type ligands, heteroatom substituted and/or heteroatom containing cyclopentadienyl-type ligands. Non-limiting examples of ligands include cyclopentadienyl ligands, cyclopentaphenanthreneyl ligands, indenyl ligands, benzindenyl ligands, fluorenyl ligands, octahydrofluorenyl ligands, cyclooctatetraendiyl ligands, cyclopentacyclododecene ligands, azenyl ligands, azulene ligands, pentalene ligands, phosphoyl ligands, phosphinimine (WO 99/40125), pyrrolyl ligands, pyrozolyl ligands, carbazolyl ligands, borabenzene ligands and the like, including hydrogenated versions thereof, for example tetrahydroindenyl ligands. $L^A$ and $L^B$ may be any other ligand structure capable of π-bonding to M. The atomic molecular weight of $L^A$ and $L^B$ may exceed 60 a.m.u., or may exceed 65 a.m.u. $L^A$ and $L^B$ may comprise one or more heteroatoms, for example, nitrogen, silicon, boron, germanium, sulfur and phosphorous, in combination with carbon atoms to form an open, acyclic, or preferably a fused, ring or ring system, for example, a hetero-cyclopentadienyl ancillary ligand. Other $L^A$ and $L^B$ ligands include but are not limited to amides, phosphides, alkoxides, aryloxides, imides, carbolides, borollides, porphyrins, phthalocyanines, corrins and other polyazomacrocycles. Independently, each $L^A$ and $L^B$ may be the same or different type of ligand that is bonded to M. In one alternative of Formula 5 only one of either $L^A$ and $L^B$ may be present.

Independently, each $L^A$ and $L^B$ may be unsubstituted or substituted with a combination of substituent groups R. Non-limiting examples of substituent groups R include one or more from the group selected from hydrogen, or linear, branched alkyl radicals, or alkenyl radicals, alkynyl radicals, cycloalkyl radicals or aryl radicals, acyl radicals, aroyl radicals, alkoxy radicals, aryloxy radicals, alkylthio radicals, dialkylamino radicals, alkoxycarbonyl radicals, aryloxycarbonyl radicals, carbamoyl radicals, alkyl- or dialkyl-carbamoyl radicals, acyloxy radicals, acylamino radicals, aroylamino radicals, straight, branched or cyclic, alkylene radicals, or combination thereof. In a preferred embodiment, substituent groups R have up to 50 non-hydrogen atoms, preferably from 1 to 30 carbon, that may also be substituted with halogens or heteroatoms or the like. Non-limiting examples of alkyl substituents R include methyl, ethyl, propyl, butyl, pentyl, hexyl, cyclopentyl, cyclohexyl, benzyl or phenyl groups and the like, including all their isomers, for example tertiary butyl, isopropyl, and the like. Other hydrocarbyl radicals include fluoromethyl, fluoroethyl, difluoroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris (trifluoromethyl)-silyl, methyl-bis(difluoromethyl)silyl, bromomethyldimethylgermyl and the like; and disubstituted boron radicals including dimethylboron for example; and disubstituted pnictogen radicals including dimethylamine, dimethylphosphine, diphenylamine, methylphenylphosphine, chalcogen radicals including methoxy, ethoxy, propoxy, phenoxy, methylsulfide and ethylsulfide. Non-hydrogen substituents R include the atoms carbon, silicon, boron, aluminum, nitrogen, phosphorous, oxygen, tin, sulfur, germanium and the like, including olefins such as but not limited to olefinically unsaturated substituents including vinyl-terminated ligands, for example but-3-enyl, prop-2-enyl, hex-5-enyl and the like. Also, at least two R groups, preferably two adjacent R groups, are joined to form a ring structure having from 3 to 30 atoms selected from carbon, nitrogen, oxygen, phosphorous, silicon, germanium, aluminum, boron or a combination thereof. Also, a substituent group R may form a carbon sigma bond to the metal M.

Other ligands may be bonded to the metal M, such as at least one leaving group Q. Q may be a monoanionic labile ligand having a sigma-bond to M. Depending on the oxidation state of the metal, the value for n may be 0, 1 or 2 such that Formula 5 above represents a neutral metallocene catalyst compound.

Non-limiting examples of Q ligands may include weak bases such as amines, phosphines, ethers, carboxylates, dienes, hydrocarbyl radicals having from 1 to 20 carbon atoms, hydrides or halogens and the like or a combination thereof. Two or more Q's may form a part of a fused ring or ring system. Other examples of Q ligands include those substituents for R as described above and including cyclobutyl, cyclohexyl, heptyl, tolyl, trifluoromethyl, tetramethylene, pentamethylene, methylidene, methoxy, ethoxy, propoxy, phenoxy, bis (N-methylanilide), dimethylamide, dimethylphosphide radicals and the like.

The catalyst composition may include one or more metallocene catalyst compounds where $L^A$ and $L^B$ of Formula V are bridged to each other by at least one bridging group, A, as represented by Formula 6:

$$L^AAL^BMQ_n \qquad \text{Formula 6}$$

The compounds of Formula 6 are known as bridged, metallocene catalyst compounds. $L^A$, $L^B$, M, Q and n are as defined above. Non-limiting examples of bridging group A include bridging groups containing at least one Group 13 to 16 atom, often referred to as a divalent moiety such as but not limited to at least one of a carbon, oxygen, nitrogen, silicon, aluminum, boron, germanium and tin atom or a combination thereof. Bridging group A may contain a carbon, silicon or germanium atom, preferably A contains at least one silicon atom or at least one carbon atom. The bridging group A may also contain substituent groups R as defined above including halogens and iron. Non-limiting examples of bridging group A may be represented by $R'_2C$, $R'_2Si$, $R'_2Si$ $R'_2Si$, $R'_2Ge$, R'P, where R' is independently, a radical group which is hydride, hydrocarbyl, substituted hydrocarbyl, halocarbyl, substituted halocarbyl, hydrocarbyl-substituted organometalloid, halocarbyl-substituted organometalloid, disubstituted boron, disubstituted pnictogen, substituted chalcogen, or halogen or two or more R' may be joined to form a ring or ring system. The bridged, metallocene catalyst compounds of Formula 4 may have two or more bridging groups A (EP 0 664 301 Be.

The metallocene catalyst compounds may be those where the R substituents on the ligands $L^A$ and $L^B$ of Formulas 5 and 6 are substituted with the same or different number of substituents on each of the ligands. The ligands $L^A$ and $L^B$ of Formulas V and VI may be different from each other.

The main catalyst system includes a main catalyst compound represented by Formula 2 above, such as a compound having the formula $[(2,3,4,5,6\text{-}Me_5C_6)NCH_2CH_2]_2NHZrBn_2$, where 2,3,4,5,6-Me5C6 represents a pentamethylphenyl group, and Bn is a benzyl group. Optionally, the main catalyst system may include a second main catalyst compound that may be represented by Formula V above, such as a zirconocene compound, such as (n-butylcyclopentadienyl)$_2$zirconium(IV) dichloride or (propylcyclopentadienyl)(1,3-dimethyl-4,5,6,7-tetrahydroindenyezirconium(IV) dimethyl.

The molar ratio of the HMW catalyst compound to the LMW catalyst compound in the catalyst formulation may be in the range from 1:20 to 20:1, or from 1:10 to 10:1, or from 1:5 to 5:1, or from 1:1 to 5:1, or from 1:1 to 3:1.

The trim catalyst may comprise a catalyst compound that may be represented by Formula 7 below; specifically, Formula 7 shows (1,3-dimethyl-4,5,6,7-tetrahydroindene)(methyl cyclopentadienyl)zirconium dimethyl:

Formula 7

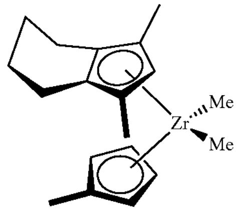

As used herein, the term "activator" may include any combination of reagents that increases the rate at which a transition metal compound oligomerizes or polymerizes unsaturated monomers, such as olefins. An activator may also affect the molecular weight, degree of branching, comonomer content, or other properties of the oligomer or polymer. The transition metal compounds may be activated for oligomerization and/or polymerization catalysis in any manner sufficient to allow coordination or cationic oligomerization and or polymerization.

Alumoxane activators may be utilized as an activator for one or more of the catalyst compositions. Alumoxane(s) or aluminoxane(s) are generally oligomeric compounds containing —Al(R)—O— subunits, where R is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is a halide. Mixtures of different alumoxanes and modified alumoxanes may also be used. For further descriptions, see U.S. Pat. Nos. 4,665,208; 4,952,540; 5,041,584; 5,091,352; 5,206,199; 5,204,419; 4,874,734; 4,924,018; 4,908,463; 4,968,827; 5,329,032; 5,248,801; 5,235,081; 5,157,137; 5,103,031; and EP 0 561 476; EP 0 279 586; EP 0 516 476; EP 0 594 218; and WO 94/10180.

When the activator is an alumoxane (modified or unmodified), the maximum amount of activator may be selected to be a 5000-fold molar excess Al/M over the catalyst precursor (per metal catalytic site). Alternatively, or additionally the minimum amount of activator-to-catalyst-precursor may be set at a 1:1 molar ratio.

Aluminum alkyl or organoaluminum compounds that may be utilized as activators (or scavengers) include trimethylaluminum, triethylaluminum, triisobutylaluminum, tri-n-hexylaluminum, tri-n-octylaluminum and the like.

The catalyst systems may include a support material or carrier. For example, the at least one or more catalyst compounds and/or one or more activators may be deposited on, contacted with, vaporized with, bonded to, or incorporated within, adsorbed or absorbed in, or on, one or more supports or carriers. Thus, the above described catalyst compounds as well as other transition metal catalyst compounds and/or catalyst systems may be combined with one or more support materials or carriers using one of the support methods well known in the art or as described below. For example, a metallocene catalyst compound or catalyst system is in a supported form, for example, when deposited on, contacted with, or incorporated within, adsorbed or absorbed in, or on, a support or carrier.

As used herein, the terms "support" and "carrier" are used interchangeably and are any support material, including a porous support material, for example, talc, inorganic oxides, and inorganic chlorides. Other carriers include resinous support materials such as polystyrene, functionalized or crosslinked organic supports, such as polystyrene divinyl benzene polyolefins or other polymeric compounds, zeolites, clays or any other organic or inorganic support material and the like, or mixtures thereof.

Illustrative support materials such as inorganic oxides include Group 2, 3, 4, 5, 13 or 14 metal oxides. The preferred supports include silica, which may or may not be dehydrated, fumed silica, alumina (see, for example, WO 99/60033), silica-alumina and mixtures thereof. Other useful supports include magnesia, titania, zirconia, magnesium chloride (U.S. Pat. No. 5,965,477), montmorillonite (EP 0 511 665), phyllosilicate, zeolites, talc, clays (U.S. Pat. No. 6,034,187), and the like. Also, combinations of these support materials may be used, for example, silica-chromium, silica-alumina, silica-titania and the like. Additional support materials may include those porous acrylic polymers described in EP 0 767 184, which is incorporated herein by reference. Other support materials include nanocomposites as disclosed in WO 99/47598; aerogels as disclosed in WO 99/48605; spherulites as disclosed in U.S. Pat. No. 5,972,510; and polymeric beads as disclosed in WO 99/50311.

In some embodiments, all catalyst compounds of the catalyst system independently may be unsupported, alternatively supported on a support material, in which latter case the catalyst system is a supported catalyst system. When each catalyst compound is supported, the catalyst compounds may reside on the same support material (e.g., same particles), or on different support materials (e.g., different particles). The bimodal catalyst system includes mixtures of unsupported catalyst compounds in slurry form and/or solution form. The support material may be a silica (e.g., fumed silica), alumina, a clay, or talc. The fumed silica may be hydrophilic (untreated), alternatively hydrophobic (treated). In some aspects the support is the hydrophobic fumed silica, which may be prepared by treating an untreated fumed silica with a treating agent such as dimethyldichlorosilane, a polydimethylsiloxane fluid, or hexamethyldisilazane. In some aspects the treating agent is dimethyldichlorosilane.

In some embodiments, the support material, such as an inorganic oxide, may have a surface area in the range of from 10 $m^2/g$ to 700 $m^2/g$, pore volume in the range of from 0.1 $cm^3/g$ to 4.0 $cm^3/g$ and average particle size in the range of from 5 microns to 500 microns. More preferably, the surface area of the support material may be in the range from 50 $m^2/g$ to 500 $m^2/g$, pore volume from 0.5 $cm^3/g$ to 3.5 $cm^3/g$ and average particle size of from 10 microns to 200 microns. Most preferably the surface area of the support material may be in the range is from 100 $m^2/g$ to 400 $m^2/g$, pore volume from 0.8 $cm^3/g$ to 3.0 $cm^3/g$ and average particle size is from 5 microns to 100 microns. The average pore size of the carrier typically has pore size in the range of from 10 Angstroms to 1,000 Angstroms, alternatively from 50 Angstroms to 500 Angstroms, and in some embodiments from 75 Angstroms to 350 Angstroms. There are various other methods in the art for supporting a polymerization catalyst compound or catalyst system. For example, the metallocene catalyst compounds may contain a polymer bound ligand as described in, for example, U.S. Pat. Nos. 5,473,202 and 5,770,755. The metallocene catalyst compounds may be spray dried as described in, for example, U.S. Pat. No. 5,648,310. The support used with the metallocene catalyst compounds may be functionalized, as described in EP 0 802 203, or at least one substituent or leaving group is selected as described in U.S. Pat. No. 5,688,880.

The polyethylene formulations disclosed herein may be made by gas phase processes. The formulations may be made in a single reactor. The polyethylene formulations disclosed herein may also be made in a single gas phase reactor. In one embodiment of the invention, the reactor is a gas phase fluidized bed polymerization reactor.

The polyethylene may be produced using a staged gas phase reactor. Commercial polymerization systems are described in, for example, "Volume 2, Metallocene-Based Polyolefins," at pages 366-378 (John Scheirs & W. Kaminsky, eds. John Wiley & Sons, Ltd. 2000); U.S. Pat. Nos. 5,665,818; 5,677,375; and 6,472,484; and EP 0 517 868 and EP 0 794 200.

Gas phase processes may utilize a fluidized bed reactor. A fluidized bed reactor may include a reaction zone and a so-called velocity reduction zone. The reaction zone may include a bed of growing polymer particles, formed polymer particles and a minor amount of catalyst particles fluidized by the continuous flow of the gaseous monomer and diluent to remove heat of polymerization through the reaction zone. Optionally, some of the re-circulated gases may be cooled and compressed to form liquids that increase the heat removal capacity of the circulating gas stream when readmitted to the reaction zone. A suitable rate of gas flow may be readily determined by simple experiment. Make up of gaseous monomer to the circulating gas stream may be at a rate equal to the rate at which particulate polymer product and monomer associated therewith may be withdrawn from the reactor and the composition of the gas passing through the reactor may be adjusted to maintain an essentially steady state gaseous composition within the reaction zone. The gas leaving the reaction zone may be passed to the velocity reduction zone where entrained particles are removed. Finer entrained particles and dust may be removed in a cyclone and/or fine filter. The gas may be passed through a heat exchanger where the heat of polymerization may be removed, compressed in a compressor, and then returned to the reaction zone. Additional reactor details and means for operating the reactor are described in, for example, U.S. Pat. Nos. 3,709,853; 4,003,712; 4,011,382; 4,302,566; 4,543,399; 4,882,400; 5,352,749; and 5,541,270; EP 0802202; and Belgian Patent No. 839,380.

The reactor temperature of the fluidized bed process may range from 30° C. or 40° C. or 50° C. to 90° C. or 100° C. or 110° C. or 120° C. or 150° C. In general, the reactor temperature may be operated at the highest temperature feasible taking into account the sintering temperature of the ethylene-based polymer product within the reactor. Regardless of the process used to make the polyolefins (e.g., bimodal polyethylene), the polymerization temperature or reaction temperature should be below the melting or "sintering" temperature of the ethylene-based polymer to be formed. Thus, the upper temperature limit may be the melting temperature of the polyolefin produced in the reactor.

Hydrogen gas may be used in olefin polymerization to control the final properties of the polyolefin, such as described in "Polypropylene Handbook," at pages 76-78 (Hanser Publishers, 1996). The amount of hydrogen in the polymerization may be expressed as a mole ratio relative to the total polymerizable monomer, for example, ethylene, or a blend of ethylene and 1-hexene or propylene. The amount of hydrogen used in the polymerization process may be an amount necessary to achieve the desired MFR or FI of the final polyolefin resin. The amount of hydrogen used in the polymerization process may also be an amount necessary to achieve a desired bimodal molecular weight distribution between the high molecular weight component and the low molecular weight component of a bimodal polyolefin.

The catalyst system may also be used to further control the properties of the polyethylene formulation. For example, the amount of trim catalyst may be adjusted to modify the in-reactor ratio of the catalyst compounds of the catalyst system so as to achieve a desired flow index or flow index split. The trim catalyst may be fed directly to the reactor separately from the main catalyst compound of the catalyst system. The trim catalyst may also be mixed with the main catalyst compound of the catalyst system prior to feeding to the reactor. The trim catalyst may also be continuously mixed with the other compounds of the catalyst system and the resulting mixture continuously fed to the reactor. The trim catalyst may be continuously mixed with a supported catalyst and the resulting mixture continuously fed to the reactor. The trim catalyst may be a supported catalyst or an unsupported catalyst. Where the trim catalyst is an unsupported catalyst it may be supported 'in-line' for example by contacting with a supported catalyst prior to feeding to the reactor. The supported trim catalyst may comprise an activator that may activate the trim catalyst 'in-line' prior to feeding to the reactor.

The trim catalyst may be provided in a form that is the same or different to that of the main catalyst compound (or one of the main catalyst compounds) of the catalyst system. However, upon activation by a suitable activator the active catalyst species resulting from the trim catalyst may be the same as the active catalyst species resulting from one of the at least two different catalyst compounds of the catalyst. The skilled person would appreciate that, for example, a metallocene dihalide and a metallocene dialkyl may yield the same active catalyst species upon treatment with a suitable activator. For example, a metallocene such as (cyclopentadienyl)(1,3-dimethyl-4,5,6,7-tetrahydroindenyl)zirconium $(X)_2$ (where X can be a halide, alkyl, or any other leaving group as previously described) may be used in the dichloride form to make a supported catalyst. When used as a trim catalyst it may be provided in the dialkyl form such as the dimethyl form. This may be advantageous in regard to solubility where dialkyl forms may have enhanced solubility in, for example, aliphatic hydrocarbons.

The catalyst system may comprise at least one, or two or more, catalyst compound(s) comprising a titanium, a zirconium, or a hafnium atom. The catalyst system may comprise at least one, or two or more, of the following:

(pentamethylcyclopentadienyl)(n-propylcyclopentadienyl)$MX_2$;

(tetramethylcyclopentadienyl)(n-propylcyclopentadienyl)$MX_2$;

(tetramethylcyclopentadienyl)(n-butylcyclopentadienyl)$MX_2$;

(n-propylcyclopentadienyl)(1,3-dimethyl-4,5,6,7-tetrahydroindenyl)$MX_2$;

(methylcyclopentadienyl)(1,3-dimethyl-4,5,6,7-tetrahydroindenyl)$MX_2$;

(cyclopentadienyl)(1,3-dimethyl-4,5,6,7-tetrahydroindenyl)$MX_2$;

(methylcyclopentadienyl)(1-methyl-4,5,6,7-tetrahydroindenyl)$MX_2$;

$Me_2Si$(indenyl)2$MX_2$;

$Me_2Si$(4,5,6,7-tetrahydroindenyl)2$MX_2$;

(n-propyl cyclopentadienyl)$_2MX_2$;

(n-butyl cyclopentadienyl)$_2MX_2$;

(1-methyl, 3-butyl cyclopentadienyl)$_2$MX$_2$;
[HN($CH_2CH_2N$(2,4,6-Me$_3C_6H_2$))$_2$]MX$_2$;
[HN($CH_2CH_2N$(2,3,4,5,6-Me$_5C_6$))$_2$]MX$_2$;
and mixtures thereof, wherein M is Zr or Hf, and X is selected from F, Cl, Br, I, Me, benzyl, $CH_2SiMe_3$, and $C_1$ to $C_5$ alkyls or alkenyls.

The mole ratio of hydrogen to total monomer ($H_2$:monomer) may be in a range from greater than 0.0001, greater than 0.0005, or greater than 0.001, and less than 10, less than 5, less than 3, or less than 0.10, wherein a desirable range may include any combination of any upper mole ratio limit with any lower mole ratio limit described herein.

The one or more reactor pressures in a gas phase process (either single stage or two or more stages) may vary from 690 kPa (100 psig) to 3,448 kPa (500 psig). For example, they may range from 1,379 kPa (200 psig) to 2,759 kPa (400 psig) or from 1,724 kPa (250 psig) to 2,414 kPa (350 psig).

In embodiments, the bimodal polyethylene may be used as a base component to produce a thermoplastic composition. In embodiments, the thermoplastic composition may optionally include one or more additives, such as antistatic agents, colorants, lubricants, pigments, primary antioxidants, secondary antioxidants, processing aids, ultraviolet (UV) stabilizers, fillers, flame retardant, and combinations thereof. The thermoplastic composition may be produced by physically mixing the bimodal polyethylene and any optional additive on the macro level, such as by melt-blending or compounding.

In embodiments, the thermoplastic composition may include the bimodal polyethylene in an amount greater than or equal to 50.1 wt. %, such as greater than or equal to 60.0 wt. %, greater than or equal to 70.0 wt. %, greater than or equal to 80.0 wt. %, greater than or equal to 90.0 wt. %, greater than or equal to 95.0 wt. %, or greater than or equal to 99.0 wt. %. The thermoplastic composition may also include the bimodal polyethylene in an amount less than or equal to 99.9 wt. %, such as less than or equal to 99.0 wt. %, less than or equal to 95.0 wt. %, less than or equal to 90.0 wt. %, less than or equal to 80.0 wt. %, less than or equal to 70.0 wt. %, or less than or equal to 60.0 wt. %. For example, the thermoplastic composition may include the bimodal polyethylene in an amount of from 50.1 wt. % to 99.9 wt. %, from 50.1 wt. % to 99.0 wt. %, from 50.1 wt. % to 95.0 wt. %, from 50.1 wt. % to 90.0 wt. %, from 50.1 wt. % to 80.0 wt. %, from 50.1 wt. % to 70.0 wt. %, from 50.1 wt. % to 60.0 wt. %, from 60.0 wt. % to 99.9 wt. %, from 60.0 wt. % to 99.0 wt. %, from 60.0 wt. % to 95.0 wt. %, from 60.0 wt. % to 90.0 wt. %, from 60.0 wt. % to 80.0 wt. %, from 60.0 wt. % to 70.0 wt. %, from 70.0 wt. % to 99.9 wt. %, from 70.0 wt. % to 99.0 wt. %, from 70.0 wt. % to 95.0 wt. %, from 70.0 wt. % to 90.0 wt. %, from 70.0 wt. % to 80.0 wt. %, from 80.0 wt. % to 99.9 wt. %, from 80.0 wt. % to 99.0 wt. %, from 80.0 wt. % to 95.0 wt. %, from 80.0 wt. % to 90.0 wt. %, from 90.0 wt. % to 99.9 wt. %, from 90.0 wt. % to 99.0 wt. %, from 90.0 wt. % to 95.0 wt. %, from 95.0 wt. % to 99.9 wt. %, from 95.0 wt. % to 99.0 wt. %, or from 99.0 wt. % to 99.9 wt. %.

In embodiments, the thermoplastic composition may include ultraviolet stabilizer in an amount greater than or equal to 0.0 wt. %, such as greater than or equal to 1.0 wt. %, greater than or equal to 2.0 wt. %, greater than or equal to 3.0 wt. %, or greater than or equal to 4.0 wt. %. The thermoplastic composition may also include ultraviolet stabilizer in an amount less than or equal to 5.0 wt. %, such as less than or equal to 4.0 wt. %, less than or equal to 3.0 wt. %, less than or equal to 2.0 wt. %, or less than or equal to 1.0 wt. %. For example, the thermoplastic composition may include ultraviolet stabilizer in an amount of from 0.0 wt. % to 5.0 wt. %, from 0.0 wt. % to 4.0 wt. %, from 0.0 wt. % to 3.0 wt. %, from 0.0 wt. % to 2.0 wt. %, from 0.0 wt. % to 1.0 wt. %, from 1.0 wt. % to 5.0 wt. %, from 1.0 wt. % to 4.0 wt. %, from 1.0 wt. % to 3.0 wt. %, from 1.0 wt. % to 2.0 wt. %, from 2.0 wt. % to 5.0 wt. %, from 2.0 wt. % to 4.0 wt. %, from 2.0 wt. % to 3.0 wt. %, from 3.0 wt. % to 5.0 wt. %, from 3.0 wt. % to 4.0 wt. %, or from 4.0 wt. % to 5.0 wt. %.

In embodiments, the thermoplastic composition may include a first antioxidant in an amount greater than or equal to 0.1 wt. %, such as greater than or equal to 0.4 wt. % or greater than or equal to 0.7 wt. %. The thermoplastic composition may also include a first antioxidant in an amount less than or equal to 1.0 wt. %, such as less than or equal to 0.7 wt. % or less than or equal to 0.4 wt. %. For example, the thermoplastic composition may include a first antioxidant in an amount of from 0.1 wt. % to 1.0 wt. %, from 0.1 wt. % to 0.7 wt. %, from 0.1 wt. % to 0.4 wt. %, from 0.4 wt. % to 1.0 wt. %, from 0.4 wt. % to 0.7 wt. %, or from 0.7 wt. % to 1.0 wt. %. In embodiments, the thermoplastic composition may include a second antioxidant in an amount greater than or equal to 0.0 wt. %, such as greater than or equal to 0.2 wt. %, greater than or equal to 0.4 wt. %, greater than or equal to 0.6 wt. %, or greater than or equal to 0.8 wt. %. The thermoplastic composition may also include a second antioxidant in an amount less than or equal to 1.0 wt. %, such as less than or equal to 0.8 wt. %, less than or equal to 0.6 wt. %, less than or equal to 0.4 wt. %, or less than or equal to 0.2 wt. %. For example, the thermoplastic composition may include a first antioxidant in an amount of from 0.0 wt. % to 1.0 wt. %, from 0.0 wt. % to 0.8 wt. %, from 0.0 wt. % to 0.6 wt. %, from 0.0 wt. % to 0.4 wt. %, from 0.0 wt. % to 0.2 wt. %, from 0.2 wt. % to 1.0 wt. %, from 0.2 wt. % to 0.8 wt. %, from 0.2 wt. % to 0.6 wt. %, from 0.2 wt. % to 0.4 wt. %, from 0.4 wt. % to 1.0 wt. %, from 0.4 wt. % to 0.8 wt. %, from 0.4 wt. % to 0.6 wt. %, from 0.6 wt. % to 1.0 wt. %, from 0.6 wt. % to 0.8 wt. %, or from 0.8 wt. % to 1.0 wt. %.

In embodiments, the thermoplastic composition may include processing aid in an amount greater than or equal to 0.0 wt. %, such as greater than or equal to 0.2 wt. %, greater than or equal to 0.4 wt. %, greater than or equal to 0.6 wt. %, or greater than or equal to 0.8 wt. %. The thermoplastic composition may also include processing aid in an amount less than or equal to 1.0 wt. %, such as less than or equal to 0.8 wt. %, less than or equal to 0.6 wt. %, less than or equal to 0.4 wt. %, or less than or equal to 0.2 wt. %. For example, the thermoplastic composition may include processing aid in an amount of from 0.0 wt. % to 1.0 wt. %, from 0.0 wt. % to 0.8 wt. %, from 0.0 wt. % to 0.6 wt. %, from 0.0 wt. % to 0.4 wt. %, from 0.0 wt. % to 0.2 wt. %, from 0.2 wt. % to 1.0 wt. %, from 0.2 wt. % to 0.8 wt. %, from 0.2 wt. % to 0.6 wt. %, from 0.2 wt. % to 0.4 wt. %, from 0.4 wt. % to 1.0 wt. %, from 0.4 wt. % to 0.8 wt. %, from 0.4 wt. % to 0.6 wt. %, from 0.6 wt. % to 1.0 wt. %, from 0.6 wt. % to 0.8 wt. %, or from 0.8 wt. % to 1.0 wt. %.

In embodiments, the thermoplastic composition may include flame retardant in an amount greater than or equal to 0.0 wt. %, such as greater than or equal to 0.2 wt. %, greater than or equal to 0.4 wt. %, greater than or equal to 0.6 wt. %, or greater than or equal to 0.8 wt. %. The thermoplastic composition may also include flame retardant in an amount less than or equal to 1.0 wt. %, such as less than or equal to 0.8 wt. %, less than or equal to 0.6 wt. %, less than or equal to 0.4 wt. %, or less than or equal to 0.2 wt. %. For example, the thermoplastic composition may include flame retardant in an amount of from 0.0 wt. % to 1.0 wt. %, from 0.0 wt. % to 0.8 wt. %, from 0.0 wt. % to 0.6 wt. %, from 0.0 wt. % to 0.4 wt. %, from 0.0 wt. % to 0.2 wt. %, from 0.2 wt. % to 1.0 wt. %, from 0.2 wt. % to 0.8 wt. %, from 0.2 wt. % to 0.6 wt. %, from 0.2 wt. % to 0.4 wt. %, from 0.4 wt. % to 1.0 wt. %, from 0.4 wt. % to 0.8 wt. %, from 0.4 wt. % to 0.6 wt. %, from 0.6 wt. % to 1.0 wt. %, from 0.6 wt. % to 0.8 wt. %, or from 0.8 wt. % to 1.0 wt. %.

In embodiments, the thermoplastic composition may include filler in an amount greater than or equal to 0.0 wt. %, such as greater than or equal to 0.2 wt. %, greater than or equal to 0.4 wt. %, greater than or equal to 0.6 wt. %, or greater than or equal to 0.8 wt. %. The thermoplastic composition may also include filler in an amount less than or equal to 1.0 wt. %, such as less than or equal to 0.8 wt. %, less than or equal to 0.6 wt. %, less than or equal to 0.4 wt. %, or less than or equal to 0.2 wt. %. For example, the thermoplastic composition may include filler in an amount of from 0.0 wt. % to 1.0 wt. %, from 0.0 wt. % to 0.8 wt. %, from 0.0 wt. % to 0.6 wt. %, from 0.0 wt. % to 0.4 wt. %, from 0.0 wt. % to 0.2 wt. %, from 0.2 wt. % to 1.0 wt. %, from 0.2 wt. % to 0.8 wt. %, from 0.2 wt. % to 0.6 wt. %, from 0.2 wt. % to 0.4 wt. %, from 0.4 wt. % to 1.0 wt. %, from 0.4 wt. % to 0.8 wt. %, from 0.4 wt. % to 0.6 wt. %, from 0.6 wt. % to 1.0 wt. %, from 0.6 wt. % to 0.8 wt. %, or from 0.8 wt. % to 1.0 wt. %.

The bimodal polyethylene or the thermoplastic composition including the bimodal polyethylene may be used in a wide variety of products and end-use applications. The bimodal polyethylene or the thermoplastic composition including the bimodal polyethylene may also be blended and/or co-extruded with any other polymer. Non-limiting examples of other polymers include linear low density polyethylene, elastomers, plastomers, high pressure low density polyethylene, high density polyethylene, polypropylenes and the like. The bimodal polyethylene, the thermoplastic composition including the bimodal polyethylene, and blends thereof may be used to produce blow molded components or products, among various other end uses. The bimodal polyethylene, the thermoplastic composition including the bimodal polyethylene, and blends thereof may be useful in forming operations such as film, sheet, and fiber extrusion and co-extrusion as well as blow molding, injection molding and rotary molding. Films may include blown or cast films formed by coextrusion or by lamination useful as shrink film, cling film, stretch film, sealing films, oriented films, snack packaging, heavy duty bags, grocery sacks, baked and frozen food packaging, medical packaging, industrial liners, and membranes in food-contact and non-food contact applications. Fibers may include melt spinning, solution spinning and melt blown fiber operations for use in woven or non-woven form to make filters, diaper fabrics, medical garments, and geotextiles. Extruded articles may include medical tubing, wire and cable coatings, pipe, geomembranes, and pond liners. Molded articles may include single and multi-layered constructions in the form of bottles, tanks, large hollow articles, rigid food containers and toys.

In embodiments, the bimodal polyethylene, the thermoplastic composition including the bimodal polyethylene, and blends thereof may be used to manufacture a coated conductor. The coated conductor may include a conductive core and a coating layer covering at least a portion of the conductive core. The conductive core may include metallic wire, optical fiber, or combinations thereof. The coating layer may include the bimodal polyethylene, the thermoplastic composition including the bimodal polyethylene, and blends thereof. Electricity, light, or combinations thereof, may be transmitted through the conductive core of the coated conductor. This may be accomplished by applying a voltage across the metallic wire, which may cause electrical energy to flow through the metallic wire, sending a pulse of light (e.g., infrared light) through the optical fiber, which may cause light to transmit through the optical fiber, or combinations thereof.

Environmental stress-cracking resistance is a measure of the strength of an article in terms of its ability to resist failure by stress crack growth. A high environmental stress-cracking resistance value is important because articles should last through the designed application lifetime. In embodiments, articles including the bimodal polyethylene, the thermoplastic composition including the bimodal polyethylene, or blends thereof, may have an environmental stress-cracking resistance ($F_0$) greater than 24 hours, such as greater than or equal to 48 hours, greater than or equal to 96 hours, greater than or equal to 192 hours, greater than or equal to 384 hours, greater than or equal to 768 hours, greater than or equal to 1,536 hours, or greater than 3,072 hours. Articles comprising the thermoplastic composition may also have an environmental stress-cracking resistance ($F_0$) less than 6,144 hours, such as less than or equal to 3,072 hours, less than or equal to 1,536 hours, less than or equal to 768 hours, less than or equal to 384 hours, less than or equal to 192 hours, less than or equal to 96 hours, or less than 48 hours. For example, articles comprising the thermoplastic composition may have an environmental stress-cracking resistance ($F_0$) of from 24 hours to 6,144 hours, from 24 hours to 3,072 hours, from 24 hours to 1,536 hours, from 24 hours to 768 hours, from 24 hours to 384 hours, from 24 hours to 192 hours, from 24 hours to 96 hours, from 24 hours to 48 hours, from 48 hours to 6,144 hours, from 48 hours to 3,072 hours, from 48 hours to 1,536 hours, from 48 hours to 768 hours, from 48 hours to 384 hours, from 48 hours to 192 hours, from 48 hours to 96 hours, from 96 hours to 6,144 hours, from 96 hours to 3,072 hours, from 96 hours to 1,536 hours, from 96 hours to 768 hours, from 96 hours to 384 hours, from 96 hours to 192 hours, from 192 hours to 6,144 hours, from 192 hours to 3,072 hours, from 192 hours to 1,536 hours, from 192 hours to 768 hours, from 192 hours to 384 hours, from 384 hours to 6,144 hours, from 384 hours to 3,072 hours, from 384 hours to 1,536 hours, from 384 hours to 768 hours, from 768 hours to 6,144 hours, from 768 hours to 3,072 hours, from 768 hours to 1,536 hours, from 1,536 hours to 6,144 hours, from 1,536 hours to 3,072 hours, or from 3,072 hours to 6,144 hours.

Hot creep is measured to determine the degree of cure (crosslinking) and hot set is used to measure the sample relaxation after hot creep elongation. In embodiments, articles comprising the thermoplastic composition may have a hot set greater than or equal to 80 percent (%), such as greater than or equal to 100%, greater than or equal to 120%, greater than or equal to 140%, greater than or equal to 160%, or greater than or equal to 180%. Articles comprising the thermoplastic composition may also have a hot set less than 200%, such as less than or equal to 180%, less than or equal to 160%, less than or equal to 140%, less than or equal to 120%, or less than or equal to 100%. For example, articles comprising the thermoplastic composition may have a hot set of from 80% to 200%, from 80% to 180%, from 80% to 160%, from 80% to 140%, from 80% to 120%, from 80% to 100%, from 100% to 200%, from 100% to 180%, from 100% to 160%, from 100% to 140%, from 100% to 120%, from 120% to 200%, from 120% to 180%, from 120% to 160%, from 120% to 140%, from 140% to 200%, from 140% to 180%, from 140% to 160%, from 160% to 200%, from 160% to 180%, or from 180% to 200%.

Test Methods

Density

Unless indicated otherwise, all densities disclosed herein were measured according to ASTM D792-08, Method B, and are reported in grams per cubic centimeter ($g/cm^3$).

Samples for density measurements were prepared according to ASTM D4703-10. Samples were pressed at 190° C., for five minutes, at 10,000 psi (68 MPa). The temperature was maintained at 190° C. for the above five minutes, and then the pressure was increased to 30,000 psi (207 MPa) for three minutes. This was followed by a one minute hold at 21° C. and 30,000 psi (207 MPa). Measurements were made within one hour of sample pressing.

Melt Index ($I_2$)

Unless indicated otherwise, all melt indices ($I_2$) disclosed herein were measured according to ASTM D1238-10, Method B, at 190° C. and a 2.16 kg load, and are reported in decigrams per minute (dg/min).

High Load Melt Index ($I_{21}$)

Unless indicated otherwise, all high load melt indices ($I_{21}$) disclosed herein were measured according to ASTM D1238-10, Method B, at 190° C. and a 21.6 kg load, and are reported in decigrams per minute (dg/min).

Molecular Weight

Unless indicated otherwise, all molecular weights disclosed herein, including weight average molecular weight ($M_w$) number average molecular weight ($M_n$), and z-average molecular weight ($M_z$), were measured using conventional Gel Permeation Chromatography (GPC) and are reported in grams per mole (g/mol).

The chromatographic system consisted of a PolymerChar GPC-IR (Valencia, Spain) high temperature GPC chromatograph equipped with an internal IR5 infra-red detector (IR5). The autosampler oven compartment was set at 160 degrees Celsius (° C.) and the column compartment was set at 150° C. The columns used were four Agilent "Mixed A" 30-centimeter 20-micron linear mixed-bed columns. The chromatographic solvent used was 1,2,4 trichlorobenzene and contained 200 parts per million (ppm) of butylated hydroxytoluene (BHT). The solvent source was nitrogen sparged. The injection volume used was 200 microliters and the flow rate was 1.0 milliliters per minute (ml/min).

Calibration of the GPC column set was performed with 21 narrow molecular weight distribution polystyrene standards, commercially available from Agilent Technologies, with molecular weights ranging from 580 g/mol to 8,400,000 g/mol and were arranged in six "cocktail" mixtures with at least a decade of separation between individual molecular weights. The polystyrene standards were prepared at 0.025 grams in 50 milliliters of solvent for molecular weights equal to or greater than 1,000,000 g/mol, and 0.05 grams in 50 milliliters of solvent for molecular weights less than 1,000,000 g/mol. The polystyrene standards were dissolved at 80° C. with gentle agitation for 30 minutes. The polystyrene standard peak molecular weights were converted to polyethylene molecular weights using Equation 1 (as described in Williams and Ward, J. Polym. Sci., Polym. Let., 6, 621 (1968)).:

$$M_{polyethylene} = A \times (M_{polystyrene})^B \quad \text{Equation 1}$$

where M is the molecular weight, A has a value of 0.4315, and B is equal to 1.0.

A fifth order polynomial was used to fit the respective polyethylene-equivalent calibration points. A small adjustment to A (from approximately 0.375 to 0.445) was made to correct for column resolution and band-broadening effects such that linear homopolymer polyethylene standard is obtained at a molecular weight of 120,000 g/mol.

The total plate count of the GPC column set was performed with decane (prepared at 0.04 grams in 50 milliliters of TCB and dissolved for 20 minutes with gentle agitation). The plate count (Equation 2) and symmetry (Equation 3) were measured on a 200 microliter injection according to the following equations:

$$\text{Plate Count} = 5.54 * \left( \frac{(RV_{Peak\,Max})}{\text{Peak Width at } \frac{1}{2} \text{ Height}} \right)^2 \quad \text{Equation 2}$$

where RV is the retention volume in milliliters, the peak width is in milliliters, the peak max is the maximum height of the peak, and ½height is ½height of the peak maximum; and $$\text{Symmetry} = \frac{(\text{Rear Peak } RV_{One\,Tenth\,Height} - RV_{Peak\,Max})}{(RV_{Peak\,Max} - \text{Front Peak } RV_{One\,Tenth\,Height})} \quad \text{Equation 3}$$

where RV is the retention volume in milliliters and the peak width is in milliliters, peak max is the maximum position of the peak, one tenth height is 1/10height of the peak maximum, and where rear peak refers to the peak tail at later retention volumes than the peak max and where front peak refers to the peak front at earlier retention volumes than the peak max. The plate count for the chromatographic system should be greater than 18,000 and symmetry should be between 0.98 and 1.22.

Samples were prepared in a semi-automatic manner with the PolymerChar "Instrument Control" Software, wherein the samples were weight-targeted at 2 milligrams per milliliter (mg/ml), and the solvent (containing 200 ppm BHT) was added to a pre nitrogen-sparged septa-capped vial, via the PolymerChar high temperature autosampler. The samples were dissolved for 2 hours at 160° C. under "low speed" shaking.

The calculations of weight average molecular weight ($M_{w(GPC)}$), number average molecular weight ($M_{n(GPC)}$), and z-average molecular weight ($M_{z(GPC)}$) were based on GPC results using the internal IRS detector (measurement channel) of the PolymerChar GPC-IR chromatograph according to Equations 4-6, using the PolymerChar GPCOne™ software, the baseline-subtracted IR chromatogram at each equally-spaced data collection point (i), and the polyethylene equivalent molecular weight obtained from the narrow standard calibration curve for the point (i) from Equation 1.

$$Mn_{(GPC)} = \frac{\sum^{i} IR_i}{\sum^{i} \left( IR_i / M_{polyethylene_i} \right)} \quad \text{Equation 4}$$

$$Mw_{(GPC)} = \frac{\sum^{i} \left( IR_i * M_{polyethylene_i} \right)}{\sum^{i} IR_i} \quad \text{Equation 5}$$

-continued

Equation 6

$$Mz_{(GPC)} = \frac{\sum^{i}\left(IR_i * M^2_{polyethylene_i}\right)}{\sum^{i}\left(IR_i * M_{polyethylene_i}\right)}$$

In order to monitor the deviations over time, a flowrate marker (decane) was introduced into each sample via a micropump controlled with the PolymerChar GPC-IR system. This flowrate marker (FM) was used to linearly correct the pump flowrate ($Flowrate_{(Nominal)}$) for each sample by RV alignment of the respective decane peak within the sample ($RV_{(FM\ Sample)}$) to that of the decane peak within the narrow standards calibration ($RV_{(FM\ Calibrated)}$). Any changes in the time of the decane marker peak are then assumed to be related to a linear-shift in flowrate ($Flowrate_{(Effective)}$) for the entire run. To facilitate the highest accuracy of a RV measurement of the flow marker peak, a least-squares fitting routine is used to fit the peak of the flow marker concentration chromatogram to a quadratic equation. The first derivative of the quadratic equation is then used to solve for the true peak position. After calibrating the system based on a flow marker peak, the effective flowrate (with respect to the narrow standards calibration) is calculated according to Equation 7. Processing of the flow marker peak was done via the PolymerChar GPCOne™ Software. Acceptable flowrate correction is such that the effective flowrate should be within ±1 percent (%) of the nominal flowrate.

$$Flowrate_{(Effective)} = Flowrate_{(Nominal)} \times \left(\frac{RV_{(FM\ Calibrated)}}{RV_{(FM\ Sample)}}\right)$$ Equation 7

The Systematic Approach for the determination of multi-detector offsets is done in a manner consistent with that published by Balke, Mourey, et. al. (Mourey and Balke, Chromatography Polym. Chpt 12, (1992)) (Balke, Thitiratsakul, Lew, Cheung, Mourey, Chromatography Polym. Chpt 13, (1992)), optimizing triple detector log (MW and IV) results from a broad homopolymer polyethylene standard ($M_w/M_n>3$) to the narrow standard column calibration results from the narrow standards calibration curve using PolymerChar GPCOne™ Software.

The absolute molecular weight data (GPC-LALS) was obtained in a manner consistent with that published by Zimm (Zimm, B. H., J. Chem. Phys., 16, 1099 (1948)) and Kratochvil (Kratochvil, P., Classical Light Scattering from Polymer Solutions, Elsevier, Oxford, NY (1987)) using PolymerChar GPCOne™ software. The overall injected concentration, used in the determination of the molecular weight, was obtained from the mass detector area and the mass detector constant, derived from a suitable linear polyethylene homopolymer, or one of the polyethylene standards of known weight-average molecular weight. The calculated molecular weights (using GPCOne™) were obtained using a light scattering constant, derived from a homopolymer polyethylene standard, and a refractive index concentration coefficient, dn/dc, of 0.104. Generally, the mass detector response (IR5) and the light scattering constant (determined using GPCOne™) should be determined from a linear standard with a molecular weight in excess of about 50,000 g/mol, preferably in excess of about 120,000 g/mol. Other respective moments, $M_{n(Abs)}$ and $M_{z(Abs)}$ are be calculated according to Equations 8-9 as follows:

Equation 8

$$Mn_{(Abs)} = \frac{\sum^{i} IR_i}{\sum^{i}\left(IR_i / M_{Absolute_i}\right)}$$

Equation 9

$$Mz_{(Abs)} = \frac{\sum^{i}\left(IR_i * M^2_{Absolute_i}\right)}{\sum^{i}\left(IR_i * M_{Absolute_i}\right)}$$

A calibration for the IR5 detector ratioing was performed using multiple ethylene-based polymer of known short chain branching (SCB) frequency (as determined by NMR), ranging from homopolymer (0 SCB/1000 total C) to approximately 40 SCB/1000 total C, where total C=carbons in backbone+carbons in branches. Each standard had a weight-average molecular weight ($M_w$) from 36,000 g/mol to 126,000 g/mol, as determined by the GPC-LALS processing method described above. Each standard had a molecular weight distribution (Mw/Mn) from 2.0 to 2.5, as determined by the GPC-LALS processing method described hereinabove.

The calculated "IR5 Area Ratio" (or "$IR5_{Methyl\ Channel\ Area}/IR5_{Measurement\ Channel\ Area}$") of "the baseline-subtracted area response of the IR5 methyl channel sensor" to "the baseline-subtracted area response of IR5 measurement channel sensor" was calculated for each of the "SCB" standards. A linear fit of the SCB frequency versus the "IR5 Area Ratio" was constructed according to Equation 10 as follows:

Equation 10

$$SCB/1000\text{ total C }(SCBD) = A_0 + \left[A_1 \times \left(\frac{IR5_{Methyl\ Channel\ Area}}{IR5_{Measurement\ Channel\ Area}}\right)\right]$$

where $A_0$ is the "SCB/1000 total C" intercept at an "IR5 Area Ratio" of zero, and $A_1$ is the slope of the "SCB/1000 total C" versus "IR5 Area Ratio" and represents the increase in the SCB/1000 total C as a function of "IR5 Area Ratio."

The calculations of short chain branching distributions of low molecular weight components ($SCBD_1$), short chain branching distributions of high molecular weight components ($SCBD_2$), and Comonomer Ratios were based on GPC results using the internal IRS detector (measurement channel) and the SCB/1000 total C for a bimodal polyethylene. To calculate these values the baseline-subtracted IR chromatogram at equally-spaced data collection points (i) and the SCBD surrounding the maxima of the bimodal resin were determined. This calculation is determined for polymer greater than Log M 3.5 for the top two abundance maxima Log $M_{Maxima1}$ and Log $M_{Maxima2}$. Log $M_{Maxima1}$ is defined as the maxima at lower molecular weight relative to the second Log $M_{Maxima2}$. Here m and n, define the molecular weight range at which $SCBD_1$ is calculated, where m=(Log $M_{Maximal}$−0.15) and n=(Log $M_{Maximal}$+0.15). Here o and p, define the molecular weight range at which $SCBD_2$ is calculated, where o=(Log $M_{Maxima2}$−0.15) and p=(Log $M_{Maxima2}$+0.15).

Equation 11

$$SCBD_1 = \frac{\sum_m^n (IR_i \times SCBD_i)}{\sum_m^n IR_i}$$

-continued $$SCBD_2 = \frac{\sum_o^p (IR_i \times SCBD_i)}{\sum_o^p IR_i} \quad \text{Equation 12}$$

The comonomer distribution (also referred to as a comonomer ratio) is defined according to Equation 13. Any value greater than 1.0 is considered a reverse comonomer distribution, a value less than 1.0 is considered a normal comonomer distribution, and a value of 1.0 is considered a flat comonomer distribution.

$$\text{Comonomer Distribution} = \frac{SCBD_2}{SCBD_1} \quad \text{Equation 13}$$

Complex Viscosity

Unless indicated otherwise, all complex viscosities (η*) disclosed herein were calculated using Dynamic Mechanical Spectroscopy (DMS) and are reported in pascal-seconds (Pa·s).

Samples were compression-molded into "3 mm thick×1 inch" circular plaques at 350° F., for five minutes, under 25,000 psi pressure, in air. The sample was then taken out of the press, and allowed to cool.

A constant temperature frequency sweep was performed using a TA Instruments "Advanced Rheometric Expansion System (ARES)," equipped with 25 mm (diameter) parallel plates, under a nitrogen purge. Samples were placed on the plate and allowed to melt for five minutes at 190° C. The plates were then closed to a gap of "2 mm," the samples trimmed (extra sample that extends beyond the circumference of the "25 mm diameter" plate was removed), and then the tests were started. The method had an additional five minute delay built in to allow for temperature equilibrium. The tests were performed at 190° C. over a frequency range of from 0.1 radians per second (rad/s) to 100 rad/s at a constant strain amplitude of 10%.

Environmental Stress-Cracking Resistance (ESCR)

Unless indicated otherwise, all Environmental Stress-Cracking Resistance (ESCR) values disclosed herein are $F_0$ failure times reported in hours and were measured according to ASTM D1693, Method B, on compression molded samples having a thickness of 75 mm in a 10% Igepal solution at 50° C.

Tensile Strength

Unless indicated otherwise, all tensile strength values disclosed herein were measured according to ASTM D638-14, Type IV, on compression molded samples having a thickness of 75 mm and are reported in megapascals (MPa) and/or pounds per square inch (psi).

Elongation

Unless indicated otherwise, all elongation values disclosed herein were measured according to ASTM D638-14, Type IV, on compression molded samples having a thickness of 75 mm and are reported in percent (%).

Wire Smoothness

Unless indicated otherwise, all wire smoothness values disclosed herein were calculated as an average surface roughness of a coated conductor wire sample (14 American wire gauge (AWG) wire with a 10-15 mm coating thickness) and are reported in microinches (μ-in). The surface roughness values were measured using a Mitutoyo SJ 400 Surface Roughness Tester. Generally, a relatively smoother wire has an average surface roughness less than a relatively rougher wire.

Hot Creep

Unless indicated otherwise, all hot creep values disclosed herein were measured according to ICEA T-28-562, and are reported in percent elongation. The dog bone samples were prepared according to ASTM D412, Type D, and were elongated for 15 minutes at 200° C. using a 20 N/cm² weight attached to the lower end of the sample.

EXAMPLES

Example 1

Various bimodal polyethylene samples were produced via gas phase polymerization in a single-reactor. A main catalyst was fed to a polyethylene reactor, commercially available as UNIPOL™ from Univation Technologies, via a 0.25 inch (") injection tube. A trim catalyst was also fed to the polyethylene reactor via the same 0.25" injection tube at a rate sufficient to provide the desired resin flow index. The reactor gas composition was controlled by metering the feeds to the polyethylene reactor at rates sufficient to maintain the desired ethylene partial pressure, molar ratio of comonomer to ethylene ($C_2$), molar ratio of hydrogen gas ($H_2$) to ethylene ($C_2$), and amount of isopentane. An additive, commercially available as CA-300 from Univation Technologies, was fed separately to the polyethylene reactor at a rate sufficient to maintain an additive concentration of about 45 parts per million by weight (ppmw) based on the ethylene feed rate to the reactor. The polyethylene reactor temperature was maintained at a desired temperature and the reactor residence time was from about 2.0 hours to 2.5 hours. The reactor bed weight was maintained by discharging granular resin into a discharge tank, which was purged with nitrogen before being dumped into a fiberpack and purged again with a mixture of nitrogen and steam. The process conditions used to produce each bimodal polyethylene sample are reported in Table 1.

TABLE 1

| Example | Comonomer | Main Catalyst | Trim Catalyst | Molar Ratio of Comonomer to $C_2$ | Molar Ratio of $H_2$ to $C_2$ | Reactor Temperature (° C.) |
|---|---|---|---|---|---|---|
| IE-1 | Hexene | MC-1[a] | TC-1[d] | 0.0204 | 0.0060 | 100 |
| IE-2 | Hexene | MC-2[b] | TC-2[e] | 0.0300 | 0.0053 | 100 |
| IE-3 | Hexene | MC-2 | TC-2 | 0.0243 | 0.0053 | 100 |
| IE-4 | Hexene | MC-2 | TC-2 | 0.0309 | 0.0053 | 95 |
| IE-5 | Butene | MC-2 | TC-2 | 0.1270 | 0.0053 | 95 |
| IE-6 | Hexene | MC-3[c] | TC-3[f] | 0.0198 | 0.0053 | 95 |
| IE-7 | Hexene | MC-3 | TC-3 | 0.0189 | 0.0053 | 95 |

TABLE 1-continued

| Example | Comonomer | Main Catalyst | Trim Catalyst | Molar Ratio of Comonomer to $C_2$ | Molar Ratio of $H_2$ to $C_2$ | Reactor Temperature (° C.) |
|---|---|---|---|---|---|---|
| IE-8 | Hexene | MC-3 | TC-3 | 0.0143 | 0.0051 | 100 |
| IE-9 | Hexene | MC-3 | TC-3 | 0.0145 | 0.0060 | 100 |

[a]Commercially available as PRODIGY ™ BMC-200 from Univation Technologies
[b]Spray-dried mixture of bis(2-pentamethylphenylamido)ethyl)amine zirconium dibenzyl, (1,3-dimethyl-4,5,6,7-tetrahydroindene)(methyl cyclopentadienyl)zirconium dimethyl, methylalumoxane (MAO), and fumed silica, commercially available as CAB-O-SIL ® TS-610 from Cabot Corporation, in a mineral oil slurry
[c]Spray-dried mixture of bis(2-pentamethylphenylamido)ethyl)amine zirconium dibenzyl, (cyclopentadienyl])(1,5-dimethylindenyl)zirconium dimethyl, methylalumoxane (MAO), and fumed silica, commercially available as CAB-O-SIL ® TS-610 from Cabot Corporation, in a mineral oil slurry
[d]Commercially available as PRODIGY ™ TR-200 from Univation Technologies
[e]Mixture of 0.04 wt. % (1,3-dimethyl- 4,5,6,7-tetrahydroindene)(methyl cyclopentadienyl)zirconium dimethyl bis(n-butylcyclopentadienyl)zirconium dimethyl in isopentane
[f]Mixture of 0.04 wt. % (cyclopentadieny]l)(1,5-dimethylindenyl)zirconium dimethyl in isopentane Properties of Polyethylene Examples Various properties, including density, melt index ($I_2$), high load melt index ($I_{21}$), and melt flow ratio ($MFR_{21}$), of the bimodal polyethylene samples of Example 1, as well as various commercially available samples, are reported in Table 2.

TABLE 2

| Polymer | Density (g/cm$^3$) | Melt Index ($I_2$) (dg/min) | High Load Melt Index ($I_{21}$) (dg/min) | Melt Flow Ratio ($MFR_{21}$) |
|---|---|---|---|---|
| IE-1 | 0.9426 | 0.81 | 101.1 | 124.8 |
| IE-2 | 0.9407 | 0.93 | 101.0 | 108.6 |
| IE-3 | 0.9406 | 0.96 | 99.2 | 103.1 |
| IE-4 | 0.9368 | 0.78 | 81.0 | 103.5 |
| IE-5 | 0.9356 | 0.79 | 66.9 | 84.7 |
| IE-6 | 0.9379 | 0.43 | 38.8 | 90.5 |
| IE-7 | 0.9387 | 0.41 | 38.7 | 93.6 |
| IE-8 | 0.9418 | 0.33 | 34.3 | 104.7 |
| IE-9 | 0.9431 | 0.36 | 32.5 | 89.5 |
| CE-1[a] | 0.9430 | 0.86 | 44.1 | 51.3 |

TABLE 2-continued

| Polymer | Density (g/cm$^3$) | Melt Index ($I_2$) (dg/min) | High Load Melt Index ($I_{21}$) (dg/min) | Melt Flow Ratio ($MFR_{21}$) |
|---|---|---|---|---|
| CE-2[b] | 0.9450 | 0.70 | 55.3 | 79.0 |
| CE-3[c] | 0.9410 | 0.85 | 51.0 | 60.0 |
| CE-4[d] | 0.9460[f] | 0.55 | 40.0 | 72.0 |
| CE-5[e] | 0.9350 | 0.8 | 55.2 | 69.0 |

[a]Commercially available as ELITE ™ 5940G from The Dow Chemical Company
[b]Commercially available as DFNA-4580 NT from The Dow Chemical Company
[c]Commercially available as ELITE ™ 5940ST from The Dow Chemical Company
[d]Commercially available as BORSTAR ® HE6062 from Borealis AG
[e]Commercially available as DFNB-3580 NT from The Dow Chemical Company
[f]Base polymer property of CE-4 per technical data sheet Molecular Weights of Polyethylene Examples Various molecular weights, including weight average molecular weight ($M_w$), number average molecule weight ($M_n$), and z-average molecular weight ($M_z$), of the bimodal polyethylene samples of Example 1, as well as various commercially available samples, are reported in Table

TABLE 3

| Polymer | Number Average Molecular Weight ($M_n$) (g/mol) | Weight Average Molecular Weight ($M_w$) (g/mol) | Z-Average Molecular Weight ($M_z$) (g/mol) | Molecular Weight Distribution ($M_w/M_n$) | Molecular Weight Distribution ($M_z/M_w$) |
|---|---|---|---|---|---|
| IE-1 | 6,797 | 128,616 | 802,157 | 18.9 | 6.2 |
| IE-2 | 8,518 | 137,690 | 1,084,702 | 16.2 | 7.9 |
| IE-3 | 11,718 | 130,840 | 798,622 | 11.2 | 6.1 |
| IE-4 | 12,476 | 134,234 | 735,427 | 10.8 | 5.5 |
| IE-5 | 10,275 | 142,504 | 1,603,296 | 13.9 | 11.3 |
| IE-6 | 9,271 | 162,518 | 891,636 | 17.5 | 5.5 |
| IE-7 | 8,796 | 163,393 | 952,112 | 18.6 | 5.8 |
| IE-8 | 9,037 | 175,706 | 1,054,070 | 19.4 | 6.0 |
| IE-9 | 8,259 | 170,047 | 1,008,616 | 20.6 | 5.9 |
| CE-1 | 16,246 | 103,311 | 319,330 | 6.4 | 3.1 |
| CE-2 | 10,427 | 117,707 | 965,720 | 11.3 | 8.2 |
| CE-3 | 11,622 | 100,393 | 332,157 | 8.6 | 3.3 |
| CE-4 | 11,448 | 152.227 | 830,851 | 13.3 | 5.5 |
| CE-5 | 10,853 | 113,539 | 722,262 | 10.5 | 6.4 |

Comonomer Distributions of Polyethylene Examples

The short chain branching distributions of the high molecular weight components ($SCBD_2$) and the low molecular weight components ($SCBD_1$), as well as the comonomer distributions of the bimodal polyethylene samples of Example 1, as well as various commercially available samples, are reported in Table 4.

TABLE 4

| Polymer | Comonomer | SCBD of the Low Molecular Weight Component ($SCBD_1$) (average branches/ 1,000 Carbons) | SCBD of the High Molecular Weight Component ($SCBD_2$) (average branches/ 1,000 Carbons) | Comonomer Distribution ($SCBD_2$/ $SCBD_1$) |
|---|---|---|---|---|
| IE-1 | Hexene | 3.8 | 8.7 | 2.3 |
| IE-2 | Hexene | 3.8 | 12.6 | 3.3 |
| IE-3 | Hexene | 3.2 | 11.0 | 3.5 |
| IE-4 | Hexene | 4.0 | 14.3 | 3.6 |
| IE-5 | Butene | 4.2 | 16.6 | 3.9 |
| IE-6 | Hexene | 6.3 | 8.0 | 1.3 |
| IE-7 | Hexene | 5.8 | 7.8 | 1.3 |
| IE-8 | Hexene | 4.0 | 5.3 | 1.3 |
| IE-9 | Hexene | 3.4 | 4.6 | 1.4 |
| CE-1 | Octene | 0.9 | 2.3 | 2.5 |
| CE-2[a] | Hexene | — | — | — |
| CE-3 | Octene | 2.8 | 6.3 | 2.3 |
| CE-4 | Butene | 6.9 | 11.4 | 1.7 |
| CE-5[a] | Hexene | — | — | — |

[a]Unimodal Polyethylene

Complex Viscosities of Polyethylene Examples

Various complex viscosities of the bimodal polyethylene samples of Example 1, as well as various commercially available samples, are reported in Table 5.

TABLE 5

| Polymer | Complex Viscosity (η*@ 0.1 rad/ sec) (Pa · s) | Complex Viscosity (η*@ 1.0 rad/ sec) (Pa · s) | Complex Viscosity (η*@ 10 rad/ sec) (Pa · s) | Complex Viscosity (η*@ 100 rad/ sec) (Pa · s) | Shear Thinning Index (η*@ 0.1 rad/sec/ η*@100 rad/sec) |
|---|---|---|---|---|---|
| IE-1 | 14,862 | 9,092 | 3,864 | 1,069 | 13.9 |
| IE-2 | 13,029 | 8,101 | 3,560 | 1,009 | 12.9 |
| IE-3 | 13,336 | 8,040 | 3,494 | 997 | 13.4 |
| IE-4 | 14,256 | 8,892 | 3,895 | 1,107 | 12.9 |
| IE-5 | 13,790 | 8,597 | 3,858 | 1,132 | 12.2 |
| IE-6 | 24,228 | 13,848 | 5,556 | 1,479 | 16.4 |
| IE-7 | 23,711 | 13,447 | 5,369 | 1,428 | 16.6 |
| IE-8 | 29,800 | 15,929 | 6,069 | 1,545 | 19.3 |
| IE-9 | 27,025 | 15,098 | 6,029 | 1,595 | 16.9 |
| CE-1 | 17,773 | 8,275 | 3,639 | 1,213 | 14.7 |
| CE-2 | — | — | — | — | — |
| CE-3 | 18,118 | 8,818 | 3,975 | 1,275 | 14.2 |
| CE-4 | 19,965 | 11,269 | 4,617 | 1,356 | 14.7 |
| CE-5 | 16,306 | 7,766 | 3,109 | 1,015 | 16.1 |

Properties of Thermoplastic Compositions

Thermoplastic compositions were prepared by mixing various polymers, including the bimodal polyethylene samples of Example 1, with various additives using a ¾" twin screw extruder (temperature profile of 180/190/190° C. and a 60 mesh screen pack) at 60 rotations per minute (rpm). The components of the thermoplastic compositions, as well as various properties of the thermoplastic compositions, are reported in Tables 6-8.

TABLE 6

| Thermoplastic Composition | Base Polyethylene | Base Polyethylene (wt. %) | Carbon Black[a] (wt. %) | Antioxidant(wt. %) | Processing Aid[b] (wt. %) |
|---|---|---|---|---|---|
| IE-2.1 | IE-1 | 94.21 | 5.67 | 0.10[c] | 0.02 |
| IE-2.2 | IE-2 | 94.21 | 5.67 | 0.10[c] | 0.02 |
| IE-2.3 | IE-3 | 94.06 | 5.67 | 0.25[d] | 0.02 |
| IE-2.4 | IE-4 | 94.21 | 5.67 | 0.19[e] | 0.02 |
| IE-2.6 | IE-6 | 94.21 | 5.67 | 0.19[e] | 0.02 |
| IE-2.7 | IE-7 | 94.21 | 5.67 | 0.19[e] | 0.02 |
| IE-2.8 | IE-8 | 94.06 | 5.67 | 0.25[d] | 0.02 |
| IE-2.9 | IE-9 | 94.06 | 5.67 | 0.25[d] | 0.02 |
| CE-2.1 | CE-1 | 94.21 | 5.67 | 0.10[c] | 0.02 |
| CE-2.2 | CE-2 | 94.21 | 5.67 | 0.10[c] | 0.02 |
| CE-2.3 | CE-3 | 94.21 | 5.67 | 0.10[c] | 0.02 |
| CE-2.4 | CE-4 | — | — | — | — |
| CE-2.5[f] | CE-5 | — | — | — | — |

[a]Commercially available as AXELERON ™ GP A-0037 BK CPD from the Dow Chemical Company (includes 3.12 wt. % base resin and 2.55 wt. % carbon black)

[b]Commercially available as Dynamar ™ FX 5912 from 3M

[c]Commercially available as Synox -TBM6 from Synchemer

[d]Mixture of 0.15% Irgafos 168 & 0.10% Irganox 1010

[e]Commercially available as NAUGARD ® Super Q from Addivant

[f]Commercially available as AXELERON ™ FO 6548 BK CPD from the Dow Chemical Company

TABLE 7

| Thermoplastic Composition | Density ($g/cm^3$) | Melt Index ($I_2$) (dg/min) | High Load Melt Index ($I_{21}$) (dg/min) | Melt Flow Ratio ($MFR_{21}$) |
|---|---|---|---|---|
| IE-2.1 | — | 0.86 | 140 | 163 |
| IE-2.2 | — | 1.07 | 137 | 129 |
| IE-2.3 | 0.9530 | 0.95 | 108 | 114 |
| IE-2.4 | 0.9480 | 0.92 | 89 | 85 |
| IE-2.6 | 0.9490 | 0.46 | 37 | 82 |
| IE-2.7 | 0.9500 | 0.47 | 41 | 87 |
| IE-2.8 | 0.9540 | 0.37 | 33 | 99 |
| IE-2.9 | 0.9540 | 0.39 | 33 | 90 |
| CE-2.1 | — | 0.99 | 52 | 53 |
| CE-2.2 | — | 0.83 | 66 | 79 |
| CE-2.3 | — | 0.93 | 56 | 60 |
| CE-2.4 | 0.9580 | 0.55 | 40 | 72 |
| CE-2.5 | 0.9490 | 0.78 | 60 | 78 |

TABLE 8

| Thermoplastic Composition | Extrusion Line | Breaker Plate Pressure (psi) | Wire Smoothness (μ-in) | Environmental Stress-Cracking Resistance (ESCR $F_0$) (hrs) | Tensile Strength at Break (MPa) | Elongation at Break (%) |
|---|---|---|---|---|---|---|
| IE-2.1 | Mini Wire Line | — | 23.1 | >4000 | 21.9 | 671 |
| IE-2.2 | 2.5" Line | 1450 | 14.4 | >5000 | 24.7 | 607 |
| IE-2.3 | 2.5" Line | 1600 | 12.5 | >4000 | 29.3 | 643 |
| IE-2.4 | 2.5" Line | 1700 | 12.6 | >4000 | 28.0 | 599 |
| IE-2.6 | 2.5" Line | 2100 | 18.5 | >4000 | 29.7 | 684 |
| IE-2.7 | 2.5" Line | 2075 | 18.9 | >4000 | 28.6 | 702 |
| IE-2.8 | 2.5" Line | 2175 | 19.7 | >4000 | 32.3 | 711 |
| IE-2.9 | 2.5" Line | 2200 | 22.6 | >4000 | 32.3 | 711 |
| CE-2.1 | Mini Wire Line | — | 12.8 | >4000 | 29.0 | 710 |
| CE-2.2 | Mini Wire Line | — | 29.6 | <48 | 15.5 | 667 |
| CE-2.3 | 2.5" Line | 1800 | 21.9 | >5000 | 25.7 | 651 |
| CE-2.4 | 2.5" Line | 2300 | 23.9 | | 21.1 | 644 |
| CE-2.5 | 2.5" Line | 2000 | 15.5 | >4000 | 28.3 | 862 |

The 2.5" line was a Davis Standard wire coating line equipped with a 24:1 polyethylene type screw with a Maddox mixing head. The equipment was used to generate samples with a final diameter of approximately 2.9 millimeter (mm) and a wall thickness of approximately 0.635 mm on a 14 AWG solid copper conductor (1.63 mm in diameter). The extrusion line was run at a line speed of 300 ft/min.

The mini-wireline was a Brabender type wire coating line equipped with a ¾" diameter, 25:1 L/D general purpose polyethylene type screw. The equipment was used to generate samples with a final diameter of approximately 2.2 mm and a wall thickness of approximately 0.254 mm on a 14 AWG solid copper conductor (1.63 mm in diameter). The extrusion line was run at a line speed of 50 ft/min.

As shown by Table 8, the thermoplastic compositions comprising bimodal polyethylene of the present disclosure have a superior balance of processability (e.g., reduced breaker plate pressures and improved wire smoothness) and performance (e.g., improved mechanical properties, such as greater tensile strengths at break and environmental stress-cracking resistances). As noted herein, this balance of processability and performance is critical in order to ensure both success in fabrication and long-term durability of insulation and jacket layers for wires and cables during service. For example, IE-2.1 has superior wire smoothness (i.e., processability) and environmental stress-cracking resistance, tensile strength at break, and elongation at break when compared to CE-2.2 despite the similar densities and melt indices ($I_2$). Furthermore, IE-2.2 and IE-2.3 have improved breaker plate pressures and wire smoothness when compared to CE-2.3, while also maintaining similar environmental stress-cracking resistances and tensile strengths at break, despite the similar densities and melt indices ($I_2$). Similarly, IE-2.4 has an improved breaker plate pressure and wire smoothness when compared to CE-2.5, while also maintaining similar environmental stress-cracking resistances and tensile strengths at break, despite the similar densities and melt indices ($I_2$).

Example 2

Various bimodal polyethylene were produced via gas phase polymerization in a single-reactor. A main catalyst, which was a spray-dried mixture of bis(2-pentamethylphenylamido)ethyl)amine zirconium dibenzyl, (1,3-dimethyl-4,5,6,7-tetrahydroindene)(methyl cyclopentadienyl)zirconium dimethyl, methylalumoxane (MAO), and fumed silica, commercially available as CAB-O-SIL® TS-610 from Cabot Corporation, in a mineral oil slurry, was fed to a polyethylene reactor, commercially available as UNIPOL™ from Univation Technologies, via a 0.25" injection tube. A trim catalyst that was a mixture of 0.04 wt. % (1,3-dimethyl-4,5,6,7-tetrahydroindene)(methyl cyclopentadienyl)zirconium dimethyl bis(n-butylcyclopentadienyl)zirconium dimethyl in isopentane was also fed to the polyethylene reactor via the same 0.25" injection tube at a rate sufficient to provide the desired resin flow index. The reactor gas composition was controlled by metering the feeds to the polyethylene reactor at rates sufficient to maintain the desired ethylene partial pressure, molar ratio of comonomer to ethylene ($C_2$), molar ratio of hydrogen gas ($H_2$) to ethylene ($C_2$), and amount of isopentane. An additive, commercially available as CA-300 from Univation Technologies, was fed separately to the polyethylene reactor at a rate sufficient to maintain an additive concentration of about 40 ppmw based on the ethylene feed rate to the reactor. The polyethylene reactor temperature was maintained at 100° C. and the reactor residence time was from about 2.0 hours to 2.5 hours. The reactor bed weight was maintained by discharging granular resin into a discharge tank, which was purged with nitrogen before being dumped into a fiberpack and purged again with a mixture of nitrogen and steam. The process conditions for each bimodal polyethylene, as well as various properties of the bimodal polyethylene, are reported in Table 9.

TABLE 9

| Example | IE-10 | IE-11 | IE-12 |
|---|---|---|---|
| Process Conditions | | | |
| Comonomer | Hexene | Hexene | Butene |
| Molar Ratio of Comonomer to $C_2$ | 0.0110 | 0.0143 | 0.0420 |
| Molar Ratio of $H_2$ to $C_2$ | 0.0050 | 0.0050 | 0.0050 |
| Properties | | | |
| Density (g/cm$^3$) | 0.9502 | 0.9498 | 0.9506 |
| Melt Index ($I_2$) (dg/min) | 0.48 | 0.80 | 0.58 |
| High Load Melt Index ($I_{21}$) (dg/min) | 55.50 | 106.80 | 69.40 |
| Melt Flow Ratio ($MFR_{21}$) | 115.6 | 133.5 | 119.7 |
| Molecular Weights | | | |
| Number Average Molecular Weight ($M_n$) (g/mol) | 8,993 | 8,512 | 8,476 |
| Weight Average Molecular Weight ($M_w$) (g/mol) | 164,106 | 142,037 | 166,640 |
| Z-Average Molecular Weight ($M_z$) (g/mol) | 2,029,487 | 1,801,222 | 2,544,258 |
| Molecular Weight Distribution ($M_w/M_n$) | 18.2 | 16.7 | 19.7 |
| Molecular Weight Distribution ($M_z/M_w$) | 12.4 | 12.7 | 15.3 |
| Comonomer Distributions | | | |
| SCBD of the Low Molecular Weight Component ($SCBD_1$) (average branches/1,000 Carbons) | 0.4 | 0.9 | 0.3 |
| SCBD of the High Molecular Weight Component ($SCBD_2$) (average branches/1,000 Carbons) | 3.6 | 5.4 | 4.2 |
| Comonomer Distribution ($SCBD_1/SCBD_2$) | 8.6 | 5.9 | 13.1 |
| Complex Viscosities | | | |
| Complex Viscosity (η*0.1) (Pa · s) | 20,358 | 13,949 | 18,558 |
| Complex Viscosity (η*1.0) (Pa · s) | 11,977 | 8,470 | 10,881 |
| Complex Viscosity (η*10) (Pa · s) | 4,841 | 3,525 | 4,410 |
| Complex Viscosity (η*100) (Pa · s) | 1,264 | 946 | 1,162 |
| Shear Thinning Index (η*0.1/η*100) | 16.1 | 14.7 | 16.0 |

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 g/cm$^3$" is intended to mean "about 40 g/cm$^3$."

Notations used in the equations included herein refer to their standard meaning as understood in the field of mathematics. For example, "=" means equal to, "×" denotes the multiplication operation, "+" denotes the addition operation, "−" denotes the subtraction operation, ">" is a "greater than" sign, "<" is a "less than" sign, "and "I" denotes the division operation.

Every document cited herein, if any, including any cross-referenced or related patent or patent application and any patent or patent application to which this application claims priority or benefit thereof, is hereby incorporated herein by reference in its entirety unless expressly excluded or otherwise limited. The citation of any document is not an admission that it is prior art with respect to any embodiment disclosed or claimed herein or that it alone, or in any combination with any other reference or references, teaches, suggests or discloses any such embodiment. Further, to the extent that any meaning or definition of a term in this document conflicts with any meaning or definition of the same term in a document incorporated by reference, the meaning or definition assigned to that term in this document shall govern.

The invention claimed is:

1. A bimodal polyethylene comprising a high molecular weight component and a low molecular weight component, wherein the bimodal polyethylene has:

a density of from 0.933 g/cm$^3$ to 0.960 g/cm$^3$ when measured according to ASTM D792-13, Method B;

a melt index ($I_2$) of from 0.3 dg/min to 1.2 dg/min when measured according to ASTM D1238-10 at 190° C. and a 2.16 kg load;

a melt flow ratio ($MFR_{21}$) greater than 80.0 and less than or equal to 120, wherein the melt flow ratio ($MFR_{21}$) is a ratio of a high load melt index ($I_{21}$) of the bimodal polyethylene to the melt index ($I_2$), and the high load melt index ($I_{21}$) is measured according to ASTM D1238-10 at 190° C. and a 21.6 kg load;

a molecular weight distribution ($M_w/M_n$) greater than 10.0, wherein the molecular weight distribution ($M_w/M_n$) is a ratio of a weight average molecular weight ($M_w$) of the bimodal polyethylene to a number average molecular weight ($M_n$) of the bimodal polyethylene, and the weight average molecular weight ($M_w$) and the number average molecular weight ($M_n$) are measured using gel permeation chromatography (GPC);

a molecular weight distribution (Mz/Mw) from 4 to 6, wherein the molecular weight distribution (Mz/Mw) is a ratio of a z-average molecular weight (Mz) of the bimodal polyethylene, measured using GPC, to the weight average molecular weight (Mw);

a z-average molecular weight (Mz) of from 900,000 g/mol to 1,500,000 g/mol;

a reverse comonomer distribution, wherein a ratio of a short chain branching distribution of the high molecular weight component ($SCBD_2$) to a short chain branching distribution of the low molecular weight component ($SCBD_1$) is greater than 1.0, and the short chain branching distribution of the high molecular weight component ($SCBD_2$) and the short chain branching distribution of the low molecular weight component ($SCBD_1$) are measured using gel permeation chromatography (GPC); and a shear thinning index (SHI) of from 5.0 to 20.0, wherein the a shear thinning index (SHI) is a ratio of a complex viscosity of the bimodal polyethylene measured at 0.1 radians per second (η*0.1) to a complex viscosity of the bimodal polyethylene measured at 100 radians per second (η*100), and the complex viscosities of the bimodal polyethylene are determined at 190° C. using Dynamic Mechanical Spectroscopy (DMS).

2. The bimodal polyethylene of claim 1, wherein the bimodal polyethylene has a density of from 0.933 g/cm$^3$ to 0.945 g/cm$^3$.

3. The bimodal polyethylene of claim 2, wherein the short chain branching distribution of the high molecular weight component ($SCBD_2$) of the bimodal polyethylene is greater than or equal to 4.0 average number of branches/1000 Carbons.

4. The bimodal polyethylene of claim 1, wherein the bimodal polyethylene has a density of from 0.945 g/cm$^3$ to 0.960 g/cm$^3$.

5. The bimodal polyethylene of claim 4, wherein the short chain branching distribution of the high molecular weight component ($SCBD_2$) of the bimodal polyethylene is greater than or equal to 3.0 average number of branches/1000 Carbons.

6. A method for producing the bimodal polyethylene of claim 1, the method comprising polymerizing via gas-phase polymerization ethylene and at least one 1-alkene comonomer in the presence of a main catalyst and a trim catalyst in a single reactor to produce the bimodal polyethylene.

7. A thermoplastic composition comprising from 50.1 wt. % to 99.9 wt. % of the bimodal polyethylene of claim 1; and from 0.1 wt. % to 1.0 wt. % of a first antioxidant component, and optionally from 0.0 wt. % to 1.0 wt. % of a second antioxidant; from 0.0 wt. % to 5.0 wt. % of an ultraviolet stabilizer; from 0.0 wt. % to 1.0 wt. % of a processing aid; from 0.0 wt. % to 1.0 wt. % of a flame retardant; and from 0.0 wt. % to 1.0 wt. % of a filler.

8. An article manufactured using the bimodal polyethylene of claim 1.

9. The article of claim 8, wherein the article is a coated conductor comprising:

a conductive core; and a coating layer at least partially covering the conductive core, wherein the coating layer comprises the thermoplastic composition of claim 8.

10. The article of claim 9, wherein the conductive core comprises a metallic wire, an optical fiber, or both.

11. The article of claim 8, having:

an environmental stress-cracking resistance (ESCR) ($F_0$) greater than 48 hours when measured according to ASTM D1693-1, Method B, in a 10% Igepal solution at 50° C.

12. A method of transmitting electricity or light through the conductive core of the coated conductor of claim 10, the method comprising:

applying a voltage across the metallic wire, thereby causing electrical energy to flow through the metallic wire;

sending a pulse of light through the optical fiber, thereby causing light to transmit through the optical fiber; or applying a voltage across the metallic wire and sending a pulse of light through the optical fiber, thereby causing electrical energy to flow through the metallic wire and light to transmit through the optical fiber.

* * * * *